(12) United States Patent
Shao et al.

(10) Patent No.: US 12,625,657 B2
(45) Date of Patent: May 12, 2026

(54) DISPLAY METHOD AND DISPLAY APPARATUS

(71) Applicant: Beijing Shiyan Technology Co., Ltd., Beijing (CN)

(72) Inventors: Jiyang Shao, Beijing (CN); Jiankang Sun, Beijing (CN); Yachong Xue, Beijing (CN)

(73) Assignee: Beijing Shiyan Technology Co., Ltd., Beijing (CN)

( * ) Notice: Subject to any disclaimer, the term of this patent is extended or adjusted under 35 U.S.C. 154(b) by 0 days.

(21) Appl. No.: 18/723,894

(22) PCT Filed: Jun. 1, 2022

(86) PCT No.: PCT/CN2022/096698
§ 371 (c)(1),
(2) Date: Jun. 25, 2024

(87) PCT Pub. No.: WO2023/230965
PCT Pub. Date: Dec. 17, 2023

(65) Prior Publication Data
US 2025/0085914 A1 Mar. 13, 2025

(51) Int. Cl.
*G06F 3/14* (2006.01)
*G06T 17/00* (2006.01)
*G09G 5/377* (2006.01)

(52) U.S. Cl.
CPC ............... *G06F 3/14* (2013.01); *G06T 17/00* (2013.01); *G09G 5/377* (2013.01)

(58) Field of Classification Search
CPC ............ G06F 3/14; G06T 17/00; G09G 5/377
See application file for complete search history.

(56) References Cited

U.S. PATENT DOCUMENTS 4,513,317 A 4/1985 Ruoff, Jr.
2013/0257928 A1* 10/2013 Lee ...................... H04N 13/305
345/697
(Continued)

FOREIGN PATENT DOCUMENTS

CN 101656835 A 2/2010
CN 102348120 A 2/2012
(Continued)

OTHER PUBLICATIONS

PCT International Search Report and Written Opinion (w/English translations) for corresponding PCT Application No. PCT/CN2022/096698, dated Dec. 14, 2022, 16 pages.
(Continued)

*Primary Examiner* — Robert J Michaud
(74) *Attorney, Agent, or Firm* — Dority & Manning, P.A.

(57) ABSTRACT

A display method applied to a display apparatus, a display screen of the display apparatus including a plurality of display sub-regions, the display method includes: obtaining to-be-displayed image data, the to-be-displayed image data including OSD image data, the OSD image data including OSD image sub-data of n viewpoints, and n being an integer greater than or equal to 2; parsing the OSD image data, and performing data rearrangement on the parsed OSD image data; determining a to-be-displayed region corresponding to the OSD image data on the display screen according to the location information of the OSD image data, and displaying rearranged OSD image data in the to-be-displayed region, the to-be-displayed region including at least one display sub-region, and the rearranged OSD image data includes rearranged OSD image sub-data of part or all of viewpoints.

17 Claims, 14 Drawing Sheets

(56) References Cited

U.S. PATENT DOCUMENTS

| | | | | |
|---|---|---|---|---|
| 2013/0265232 A1* | 10/2013 | Yun | .................... | G09G 3/3208 |
| | | | | 345/158 |
| 2016/0373714 A1 | 12/2016 | Lee et al. | | |
| 2023/0099405 A1* | 3/2023 | Otsuka | ................... | G06F 3/013 |
| | | | | 382/232 |

FOREIGN PATENT DOCUMENTS

| | | | | |
|---|---|---|---|---|
| CN | 103369335 | A | | 10/2013 |
| CN | 103826114 | A | * | 5/2014 |
| CN | 102300114 | B | | 1/2016 |
| EP | 2391140 | A2 | | 11/2011 |

OTHER PUBLICATIONS

Extended European Search Report for corresponding Application No. 22944296.7, dated Feb. 14, 2025, 10 pages.

* cited by examiner

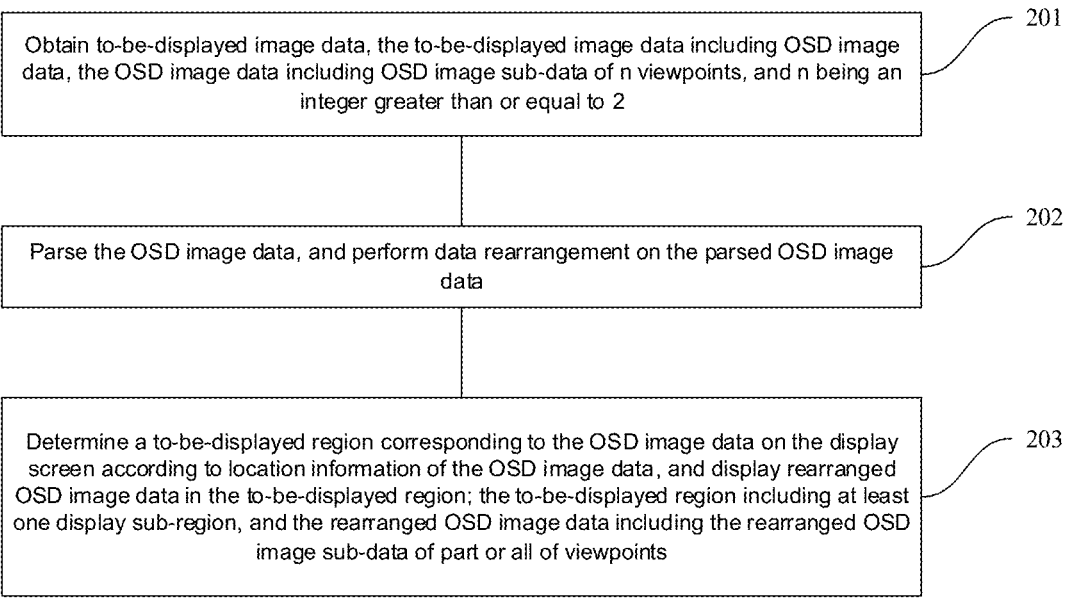

Obtain to-be-displayed image data, the to-be-displayed image data including OSD image data, the OSD image data including OSD image sub-data of n viewpoints, and n being an integer greater than or equal to 2        201

Parse the OSD image data, and perform data rearrangement on the parsed OSD image data        202

Determine a to-be-displayed region corresponding to the OSD image data on the display screen according to location information of the OSD image data, and display rearranged OSD image data in the to-be-displayed region; the to-be-displayed region including at least one display sub-region, and the rearranged OSD image data including the rearranged OSD image sub-data of part or all of viewpoints        203

FIG. 2

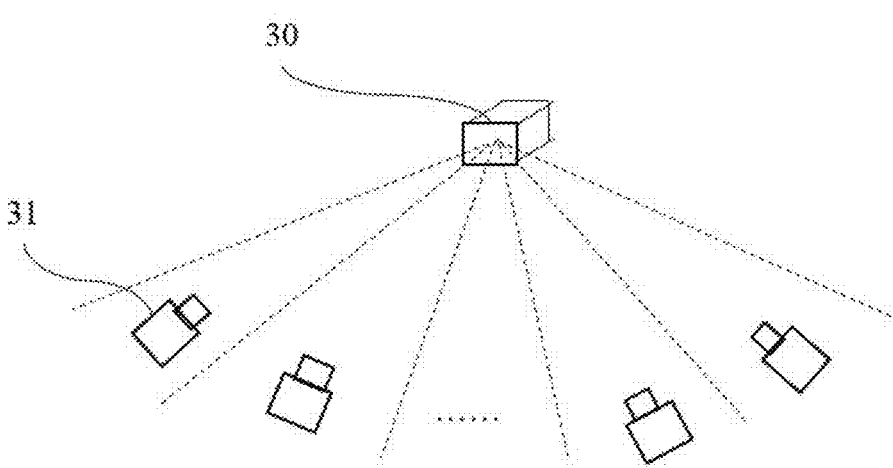

Parse the OSD image data to obtain display parameters of the OSD image data and display data of the OSD image data — 501

Perform the data rearrangement on the display data of the OSD image data according to the display parameters of the OSD image data — 502

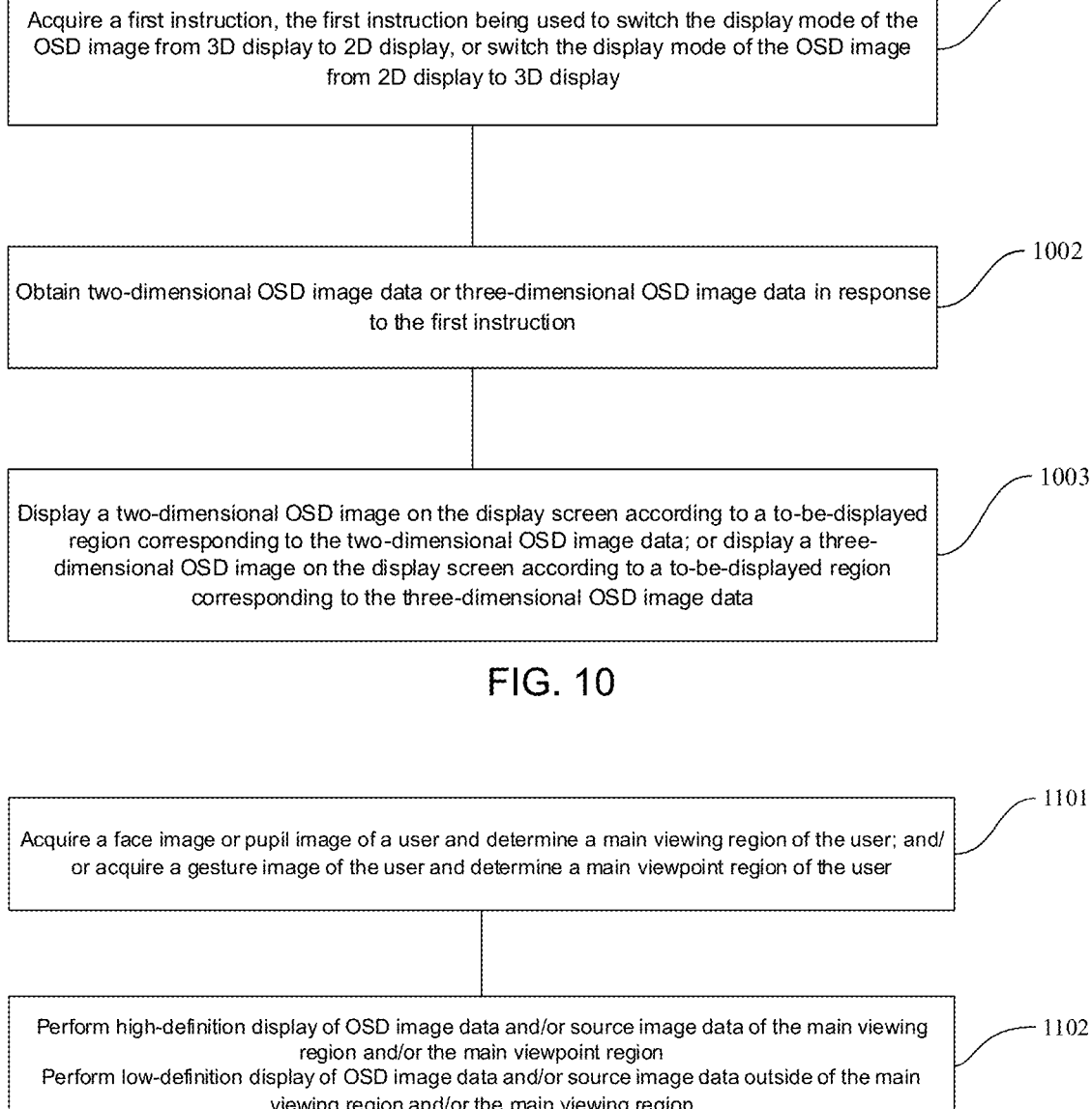

Acquire a first instruction, the first instruction being used to switch the display mode of the OSD image from 3D display to 2D display, or switch the display mode of the OSD image from 2D display to 3D display — 1001

Obtain two-dimensional OSD image data or three-dimensional OSD image data in response to the first instruction — 1002

Display a two-dimensional OSD image on the display screen according to a to-be-displayed region corresponding to the two-dimensional OSD image data; or display a three-dimensional OSD image on the display screen according to a to-be-displayed region corresponding to the three-dimensional OSD image data — 1003

FIG. 10

Acquire a face image or pupil image of a user and determine a main viewing region of the user; and/or acquire a gesture image of the user and determine a main viewpoint region of the user — 1101

Perform high-definition display of OSD image data and/or source image data of the main viewing region and/or the main viewpoint region
Perform low-definition display of OSD image data and/or source image data outside of the main viewing region and/or the main viewing region — 1102

FIG. 11

DISPLAY METHOD AND DISPLAY APPARATUS

CROSS-REFERENCE TO RELATED APPLICATION

The present application is a national phase entry under 35 USC 371 of International Patent Application No. PCT/CN2022/096698, filed on Jun. 1, 2022, which is incorporated herein by reference in its entirety.

TECHNICAL FIELD

The present disclosure relates to the field of signal identification technologies, and in particular, to a display method and a display apparatus.

BACKGROUND

With the development of display technology, display apparatuses are widely used in various fields. During using the display apparatus, it is generally necessary to invoke on screen display (OSD) images to configure the display related parameters on the display apparatus.

SUMMARY

In an aspect, a display method is provided. The display method is applied to a display apparatus, and a display screen of the display apparatus includes a plurality of display sub-regions. The display method includes: first, obtaining to-be-displayed image data, the to-be-displayed image data including OSD image data, and the OSD image data including OSD image sub-data of n viewpoints, n being an integer greater than or equal to 2; then, parsing the OSD image data, and performing data rearrangement on the parsed OSD image data; determining a to-be-displayed region corresponding to the OSD image data on the display screen according to location information of the OSD image data, and displaying rearranged OSD image data in the to-be-displayed region; the to-be-displayed region including at least one display sub-region, and the rearranged OSD image data including rearranged OSD image sub-data of part or all of viewpoints.

In some embodiments, the to-be-displayed image data further includes source image data, and the display method further includes: parsing the source image data, and performing data rearrangement on the parsed image data.

In some embodiments, displaying the rearranged OSD in the to-be-displayed region, includes: according to the to-be-displayed region corresponding to the OSD image data on the display screen, replacing rearranged source image data corresponding to the to-be-displayed region with the rearranged OSD image data, or superposing the rearranged OSD image data on the rearranged source image data corresponding to the to-be-displayed region.

In some embodiments, superimposing the rearranged OSD image data on the rearranged source image data corresponding to the to-be-displayed region includes: setting transparency for the rearranged OSD image data; and superimposing the rearranged OSD image data after setting transparency on the rearranged source image data corresponding to the to-be-displayed region.

In some embodiments, OSD image sub-data of each viewpoint includes A secondary pixels, A being an integer greater than or equal to 2; performing the data rearrangement on the parsed OSD image data includes: rearranging all secondary pixels in the OSD image sub-data of n viewpoints; different secondary pixels in the rearranged OSD image sub-data of n viewpoints are located in different rows.

In some embodiments, the A secondary pixels include a first secondary pixel, the first secondary pixel is any of the A secondary pixels, and the first secondary pixel includes t sub-pixels, t being an integer greater than or equal to 2.

In some embodiments, parsing the OSD image data and performing the data rearrangement on the parsed OSD image data includes: first, pursing the OSD image data, and obtaining display parameters of the OSD image data and display data of the OSD image data; the display parameters of the OSD image data including a viewpoint number and a display sub-region identifier corresponding to the OSD image data and a capacity of the display data of the OSD image data; then, performing the data rearrangement on the display data of the OSD image data according to the display parameters of the OSD image data.

In some embodiments, obtaining the OSD image sub-data of n viewpoints includes: photographing, by using n cameras, a first OSD model from different viewpoints to obtain the OSD image sub-data of n viewpoints; or obtaining a second OSD model by a three-dimensional modeling or an image processor to obtain the OSD image sub-data of n viewpoints according to the second OSD model.

In some embodiments, the location information of the OSD image data includes a start location of the to-be-displayed region, and length information and width information of the to-be-displayed region.

In some embodiments, the display method further includes: first, acquiring a first instruction, the first instruction being used to switch a display mode of the OSD image from 3D display to 2D display, or switch the display mode of the OSD image from 2D display to 3D display; then, obtaining two-dimensional OSD image data or three-dimensional OSD image in response to the first instruction; then, displaying a two-dimensional OSD image on the display screen according to the to-be-displayed region corresponding to the two-dimensional OSD image data; or displaying a three-dimensional OSD image on the display screen according to a to-be-displayed region corresponding to the three-dimensional OSD image data.

In some embodiments, the display method further includes: first, acquiring a face image or pupil image of a user and determining a main viewing region of the user; and/or acquiring a gesture image of the user and determining a main viewpoint region of the user; then, performing high-definition display of OSD image data and/or source image data of the main viewing region and/or the main viewing region; and performing low-definition display of OSD image data and/or source image data outside of the main viewing region and/or the main viewing region.

In another aspect, a computer-readable storage medium is provided. The computer-readable storage medium has stored computer program instructions that, when run on a computer, cause the computer to perform the display method as described in any one of the above embodiments.

In yet another aspect, a computer program product is provided. The computer program product includes computer program instructions that, when run on a computer, cause the computer to perform the display method as described in any of the above embodiments.

In yet another aspect, a computer program is provided. When executed by a computer (e.g., a display apparatus), the computer program causes the computer to perform the display method as described in the above embodiments.

In yet another aspect, a display apparatus is provided. The display apparatus includes a display screen, a data obtaining device, and a data processing device. The display screen includes a plurality of display sub-regions. The data obtaining device is configured to obtain to-be-displayed image data; the to-be-displayed image data includes OSD image data, and the OSD image data includes OSD image sub-data of n viewpoints, n being an integer greater than or equal to 2. The data processing device is configured to: purse the OSD image data, and perform data rearrangement on the pursed OSD image data; and determine a to-be-displayed region corresponding to the OSD image data on the display screen according to location information of the OSD image data, and control the to-be-displayed region of the display screen to display rearranged OSD image data. The to-be-displayed region includes at least one display sub-region, and the rearranged OSD image data includes rearranged OSD image sub-data of part or all of viewpoints.

In some embodiments, the to-be-displayed image data further includes source image data, and the data processing device is further configured to parse the source image data, and perform data rearrangement on the parsed source image data.

In some embodiments, the data processing device is configured to, according to the to-be-displayed region corresponding to the OSD image data, replace rearranged source image data corresponding to the to-be-displayed region with the rearranged OSD image data, or superposing the rearranged OSD image data on the rearranged source image data corresponding to the to-be-displayed region.

In some embodiments, the data processing device is configured to: set transparency for the rearranged OSD image data; and superimposing the rearranged OSD image data after setting transparency on the rearranged source image data corresponding to the to-be-displayed region.

In some embodiments, OSD image sub-data of each viewpoint includes A secondary pixels, A being an integer greater than or equal to 2; the data processing device is configured to rearrange all secondary pixels in the OSD image sub-data of n viewpoints; different secondary pixels in the rearranged OSD image sub-data of n viewpoints are located in different rows.

In some embodiments, the A secondary pixels include a first secondary pixel, the first secondary pixel is any of the A secondary pixels, and the first secondary pixel includes t sub-pixels, t being an integer greater than or equal to 2.

In some embodiments, the data processing device is configured to: purse the OSD image data to obtain display parameters of the OSD image data and display data of the OSD image data; the display parameters of the OSD image data including a viewpoint number and a display sub-region identifier corresponding to the OSD image data, and a capacity of the display data of the OSD image data; and perform the data rearrangement on the display data of the OSD image data according to the display parameters of the OSD image data.

In some embodiments, the data obtaining device is configured to: photograph, by using n cameras, a first OSD model from different viewpoints to obtain the OSD image sub-data of n viewpoints; or obtain a second OSD model by a three-dimensional modeling or an image processor to obtain the OSD image sub-data of n viewpoints according to the second OSD model.

In some embodiments, the location information of the OSD image data includes a start location of the to-be-displayed region, and length information and width information of the to-be-displayed region.

In some embodiments, the data obtaining device is further configured to: acquire a first instruction, the first instruction being used to switch a display mode of the OSD image from 3D display to 2D display, or switch the display mode of the OSD image from 2D display to 3D display; and obtain two-dimensional OSD image data or three-dimensional OSD image in response to the first instruction. The data processing device is configured to: control the display screen to display a two-dimensional OSD image according to the to-be-displayed region corresponding to the two-dimensional OSD image data; or control the display screen to display a three-dimensional OSD image according to the to-be-displayed region corresponding to the three-dimensional OSD image data.

In some embodiments, the display apparatus further includes a collection device configured to: acquire a face image or pupil image of a user and determine a main viewing region of the user; and/or acquire a gesture image of the user and determine a main viewpoint region of the user. The data processing device is further configured to: perform high-definition display of OSD image data and/or source image data of the main viewing region and/or the main viewpoint region; and perform low-definition display of the OSD image data and/or source image data outside of the main viewing region and/or the main viewpoint region.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings for some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

FIG. 2 is a flow diagram of a display method, in accordance with some embodiments;

FIG. 3 is a schematic diagram of a method for obtaining OSD image sub-data of multiple viewpoints, according to some embodiments of the present disclosure;

FIG. 10 is a flow diagram of yet another display method, in accordance with some embodiments;

FIG. 11 is a flow diagram of yet another display method, in accordance with some embodiments;

DETAILED DESCRIPTION

Figure 1:
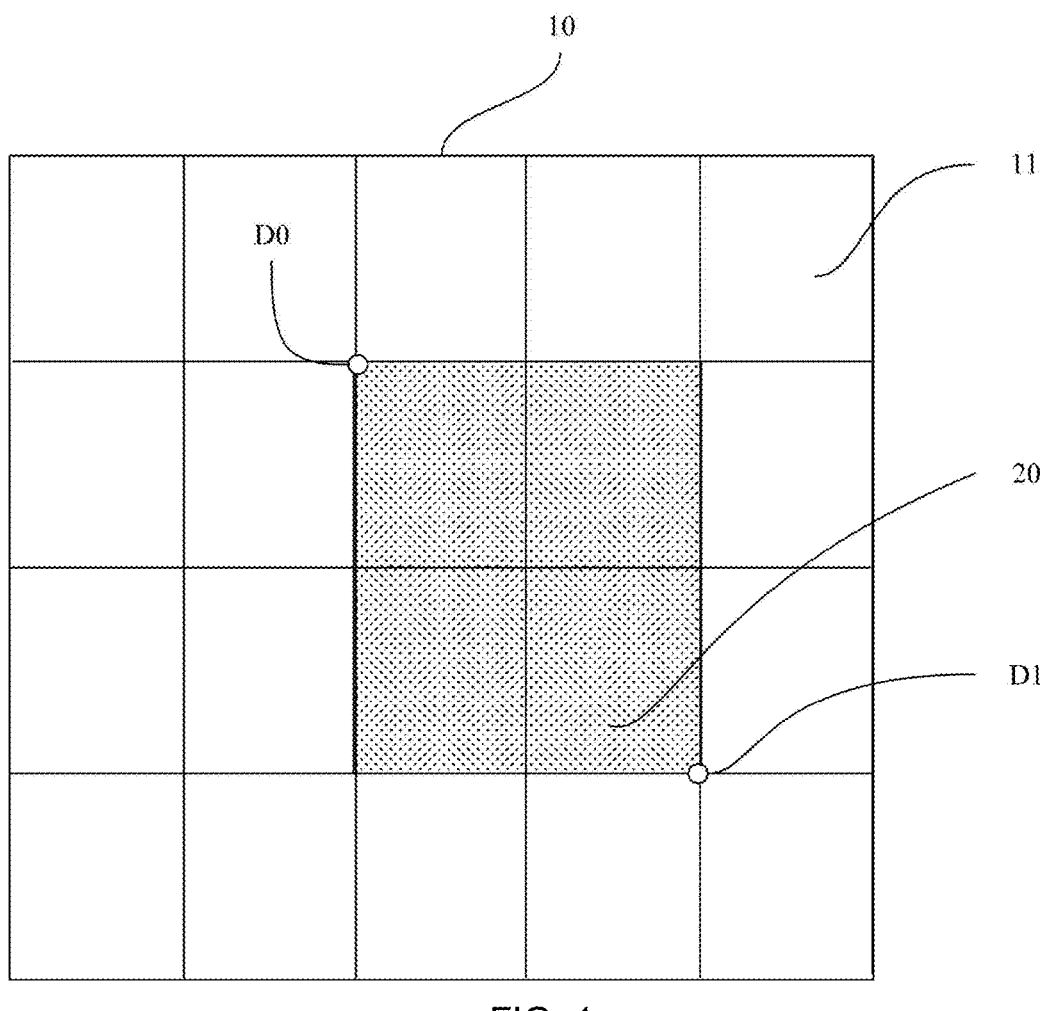
FIG. 1 is a schematic diagram of a display region of a display screen, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained by a person having ordinary skill in the art based on the embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with the term such as "first" or "second" may explicitly or implicitly include one or more features. In the description of the embodiments of the present disclosure, the term "a plurality of"/"the plurality of" means two or more unless otherwise specified.

In the description of some embodiments, the terms "coupled", "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining that" or "in response to detecting that". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" as used herein indicates an open and inclusive expression, which does not exclude devices that are applicable to or configured to perform additional tasks or steps.

In addition, the phrase "based on" as used herein is meant to be open and inclusive, since processes, steps, calculations or other actions "based on" one or more of the stated conditions or values may, in practice, be based on additional conditions or values exceeding those stated.

The term such as "about" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to segmental views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of regions in a device, and are not intended to limit the scope of the exemplary embodiments.

On screen display (OSD) is applied on a display, and some special fonts or graphics are generated on the screen of the display for the user to obtain some information. It is commonly used on the display screen of home television or personal computer, when the user operates the television to change channels or adjust the volume or picture quality, the display screen will display the current status to let the user know.

At present, the display scheme of an OSD image cannot realize 3D display of the OSD image, nor can it realize switching between 2D display and 3D display of the OSD image, and in addition, it cannot realize the effect of the OSD image of multiple viewpoints.

In order to solve these problems, some embodiments of the present disclosure provide a display method applied to a display apparatus, and the scree of the display apparatus includes a plurality of display sub-region. A display sub-region may include one or more pixel islands, and the number of the pixel islands included in the display sub-region does not limited in the present disclosure. As shown in FIG. 1, in an example in which the display screen 10 includes 20 display sub-regions 11 that can be driven separately, each display sub-region 11 is a region that can be driven separately, and a to-be-displayed region 20 of OSD includes 6 display sub-regions 11. For example, the regions that can be driven separately may be any of parallel driving regions, separately controllable regions that may be driven by the backlight hardware, or regions that may perform image quality partition process when processing the picture content. The display apparatus may be a television, a personal computer, or other apparatuses with a display screen, the specific type of the display apparatus is not limited in the present disclosure.

Some embodiments of the present disclosure provide a display method, as shown in FIG. 2, the method includes following steps.

In step 201, to-be-displayed image data is obtained; the to-be-displayed image data includes OSD image data, and the OSD image data includes OSD image sub-data of n viewpoints, n being an integer greater than or equal to 2.

In some embodiments, as shown in FIG. 3, the step of obtaining OSD image sub-data of n viewpoints includes: photographing, by using n cameras 31, a first OSD model 30 from different viewpoints to obtain OSD image sub-data of n viewpoints. For example, the camera 31 may be a camera capable of capturing photos, such as a virtual camera or a real camera, and the type of the camera 31 is not limited in the present disclosure.

In some embodiments, the OSD image sub-data of n viewpoints may be stored in a memory of a system end circuit (such as field programmable gate array (FPGA) and system on chip (SOC)) in advance, when needed, the OSD image sub-data of n viewpoints are called from the memory of the system end circuit. It can be understood that a variety of OSD image data can be stored in the memory of the system end circuit, and the number and type of OSD image corresponding to the OSD image data is not limited in the present disclosure.

In some embodiments, the step of obtaining OSD image sub-data of n viewpoints may further include: obtaining a second OSD model by a three-dimensional modeling or an image processor, and obtaining OSD image sub-data of n viewpoints according to the second OSD model. For example, the second OSD model may be generated in real time by the three-dimensional modeling or the image processor, and slice or image generation and output are performed on the second OSD model from different viewpoints, so that the OSD image sub-data of n viewpoints is obtained. The operation of the 3D modeling or the image processor may be completed by the internal system or an external system of the display apparatus, and the specific method for obtaining the second OSD model by using the 3D modeling or the image processor is not limited in the present disclosure.

The to-be-displayed image data includes OSD image data, and the OSD image data includes OSD image sub-data of n viewpoints. That is, the to-be-displayed image data includes OSD image sub-data of n viewpoints, in 1 frame image on the display screen 10, the OSD image of multiple viewpoints may be displayed at the same time, thereby realizing 3D display of the OSD image. In this way, as shown in (a) and (b) of FIG. 4, different OSD images on the display screen 10 may be obtained by the user at different viewpoint angles. As shown in (a) of FIG. 4, an image in the to-be-displayed region 20 of OSD obtained by the user at a first viewpoint angle 401 is an OSD image 4011 of a first viewpoint; as shown in (b) of FIG. 4, an image in the to-be-displayed region 20 of OSD obtained by the user at a second viewpoint angle 402 is an OSD image 4021 of a second viewpoint; the OSD image 4011 of the first viewpoint and the OSD image 4021 of the second viewpoint are any two OSD images of different viewpoints in the OSD images of n viewpoints. The number of viewpoints of the OSD image that can be displayed in 1 frame image is not limited in the present disclosure.

In step 202, the OSD image data is parsed, and data rearrangement is performed on the parsed OSD image data.

In some embodiments, as shown in FIG. 1, the OSD display region includes 6 display sub-regions 11, and thus, OSD image data may be arranged in at least one display sub-region 11 of the 6 display sub-regions 11. However, there is no partition for storage when the OSD image data is stored in the memory of the system end circuit, there is no partition for generation of the OSD image data generated in real time, and the OSD image data of the same viewpoint is not stored in the same storage address. Therefore, in order to ensure the correct display of the OSD image, there is a need to broke up and rearrange the OSD image data in the system end (such as a graphics card), and input the rearranged OSD image data into the control system of the display apparatus. The control system of the display apparatus parses and rearranges the data, and outputs the rearranged OSD image data to the display screen 10 of the display apparatus according to display requirements, and then a 3D OSD image can be displayed on the display screen 10.

Figures 4, 5:
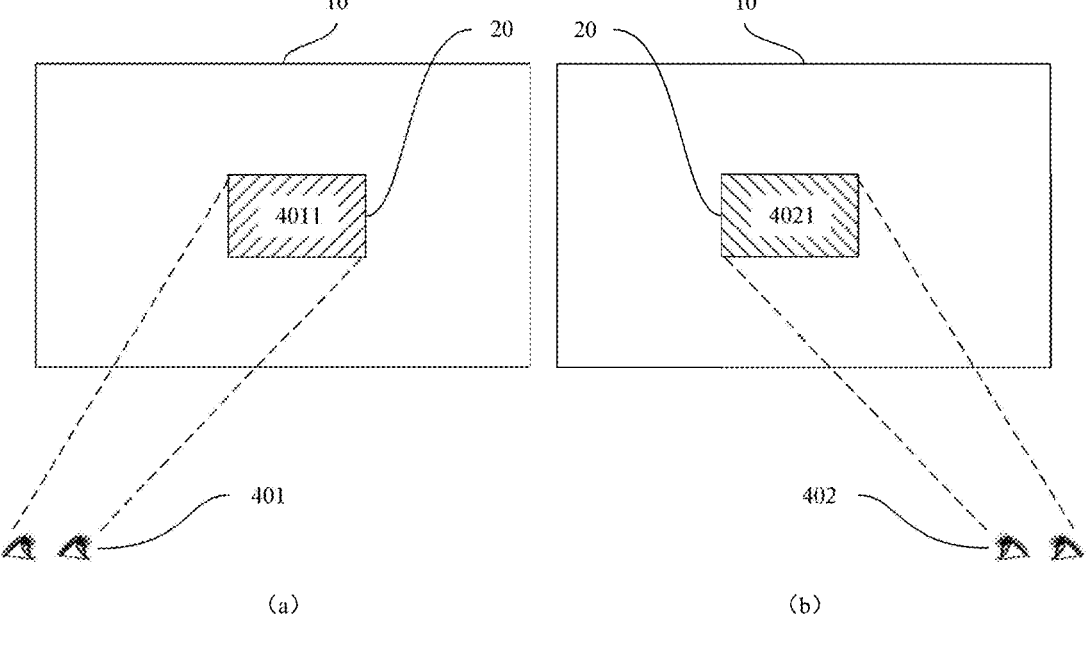
FIG. 4 is a 3D display scene diagram of an OSD image of multiple viewpoints, in accordance with some embodiments.
FIG. 5 is a flow diagram of a data parsing and data rearrangement, in accordance with some embodiments.

In some embodiments, in an example in which the OSD image data, i.e., the OSD image sub-data of n viewpoints, is stored in the memory of the system end circuit, as shown in FIG. 5, an implementation of the step 202 may include following steps.

In step 501, the OSD image data is parsed to obtain display parameters of the OSD image data and display data of the OSD image data.

Figure 6:
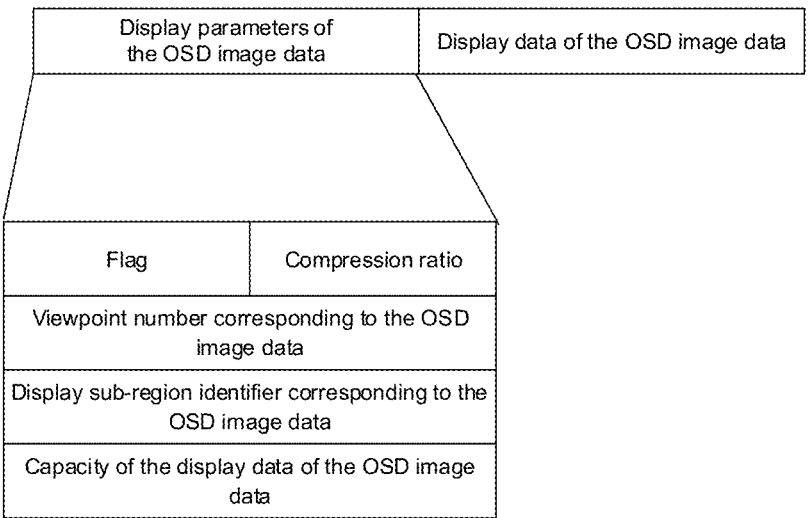
FIG. 6 is a structural diagram of OSD image data, in accordance with some embodiments.

For example, as shown in FIG. 6, the display parameters of the OSD image data include a flag, a compression ratio, a viewpoint number and a display sub-region identifier corresponding to the OSD image data, and a capacity of the display data of the OSD image data. The flags are configured to perform a handshake with instructions of front end. The compression ratio is configured as a ratio of a size of the display data of the OSD image data after being compressed to a size of the display data of the OSD image data before being compressed, so as to facilitate the compression and decompression of the display data of the OSD image data. The viewpoint number corresponding to the OSD image data is configured to store which of the n viewpoints corresponding to the OSD image data is the viewpoint. The display sub-region identifier corresponding to the OSD image data is configured to transmit the location information of the display sub-region 11 corresponding to the OSD image data to a back end. For example, the location information of the display sub-region 11 may be obtained by numbering the display sub-regions 11 of the display screen 10, e.g., numbering, starting from the upper left corner, in sequence from left to right and from top to bottom, each number corresponding to a single display sub-region. The capacity of the display data of the OSD image data is configured as a size of the OSD image data that is transmitted to the back end and needs to be displayed. For example, the capacity of the display data of the OSD image data, when only OSD image sub-data of a part of the viewpoints required be displayed, is less than a capacity of the display data of the OSD image data, when the OSD image sub-data of all viewpoints required to be displayed. The back end may reasonably configure resources for data processing according to these parameters to avoid waste of system resources. For example, the display data of the OSD image data include a pixel value of a certain sub-pixel.

In step 502, according to the display parameters of the OSD image data, the data rearrangement is performed on the display data of the OSD image data.

In some embodiments, OSD image sub-data of each viewpoint includes A secondary pixels, where A is an integer greater than or equal to 2. An implementation of the step 502 may include: rearranging all secondary pixels in the OSD image sub-data of n viewpoints. Different secondary pixels in the rearranged OSD image sub-data corresponding to n viewpoints are located in different rows. The secondary pixels may include red, green, blue, black, white, and yellow secondary pixels.

In some embodiments, the A secondary pixels include a first secondary pixel, the first secondary pixel is any one of the A secondary pixels, and the first secondary pixel includes t sub-pixels, t being an integer greater than or equal to 1.

Figure 7A:
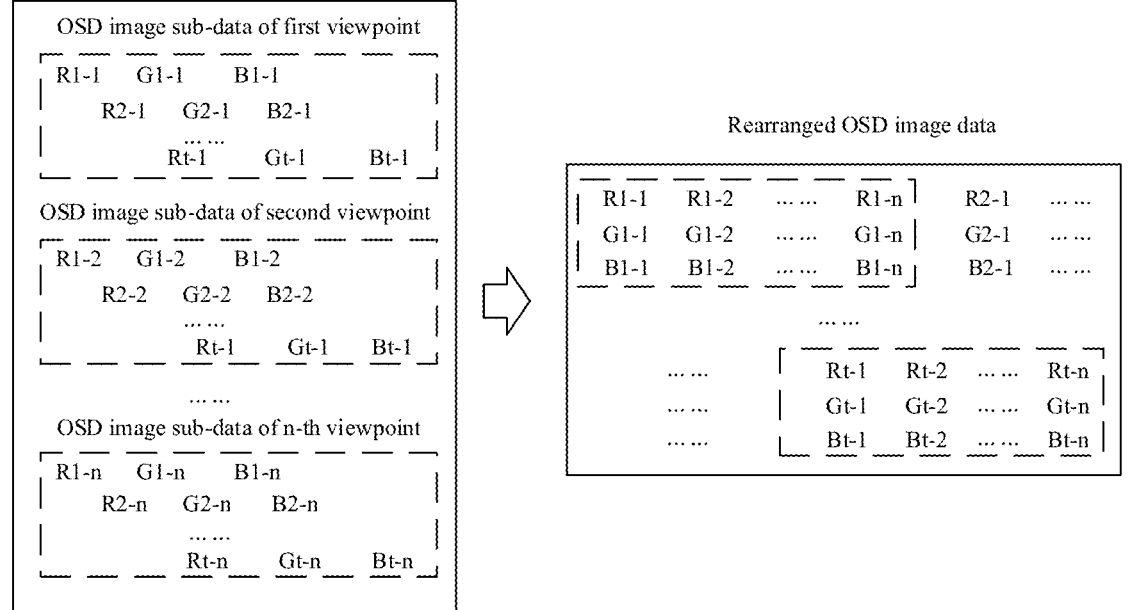
FIG. 7A is an arrangement diagram of OSD image data before and after rearrangement, in accordance with some embodiments.

As shown in FIG. 7A, in an example in which the parsed OSD image data includes the OSD image sub-data of n viewpoints, the OSD image sub-data of each viewpoint includes 3 secondary pixels, and the 3 secondary pixels are a red secondary pixel (R), a green secondary pixel (G) and a blue secondary pixel (B), respectively. In the OSD image sub-data of each viewpoint, each red secondary pixel includes t sub-pixels, such as sub-pixels R1-1, R1-2, . . . , R1-t, each green secondary pixel includes t sub-pixels, such as sub-pixels G1-1, G1-2, . . . , G1-t, and each blue secondary pixel includes t sub-pixels, such as sub-pixels B1-1, B1-2, . . . , B1-t. When the rearrangement is performed, according to a display parameter corresponding to each display data, such as the pixel value of the sub-pixel, of the OSD image data, the rearrange is performed according to location information of the display data. For example, in the rearranged OSD image data, the display data R1-1 corresponds to a start location of the to-be-displayed region 20 of the OSD image, and the display data Rt-n corresponds to an end location of the to-be-displayed region 20. It will be understood that, as shown in FIG. 1, when the to-be-displayed region 20 of OSD is in a shape of a rectangle, the start location of the to-be-displayed region 20 of OSD is a position DO where the first pixel at the upper left corner of the rectangle is located, and the end location of the to-be-displayed region 20 of OSD is a position D1 where the last pixel at the lower right corner of the rectangle is located. In this way, when the rearranged OSD image data is time-series controlled input to the display screen 10, it will be displayed according to the rearranged OSD image data.

For example, a more intuitive description will be made by taking an example in which the value of n is 5, and the value of t is 4; that is, the OSD image data includes the OSD image sub-data of 5 viewpoints, each secondary pixel includes 4 sub-pixels, each sub-pixel has a pixel value, the to-be-displayed region 20 includes 12 rows*5 columns of pixels, and the pixels are in one-to-one correspondence with the pixel values of the sub-pixels.

As shown in Table 1, the OSD image sub-data of each viewpoint includes pixel values of 15 sub-pixels. The OSD image sub-data 501 of the first viewpoint includes pixel values (e.g., R1-1, R1-2, R1-3 and R1-4) of 4 sub-pixels of the red secondary pixel, pixel values (e.g., G1-1, G1-2, G1-3, and G1-4) of 4 sub-pixels of the green secondary pixel, and pixel values (e.g., B1-1, B1-2, B1-3, and B1-4) of 4 sub-pixels of the blue secondary pixel. The OSD image sub-data 502 of the second viewpoint includes pixel values (e.g., R2-1, R2-2, R2-3 and R2-4) of 4 sub-pixels of the red secondary pixel, pixel values (e.g., G2-1, G2-2, G2-3, and G2-4) of 4 sub-pixels of the green secondary pixel, and pixel values (e.g., B2-1, B2-2, B2-3, and B2-4) of 4 sub-pixels of the blue secondary pixel. By analogy, the OSD image sub-data 505 of the fifth viewpoint includes pixel values (e.g., R5-1, R5-2, R5-3 and R5-4) of 4 sub-pixels of the red secondary pixel, pixel values (e.g., G5-1, G5-2, G5-3, and G5-4) of 4 sub-pixels of the green secondary pixel, and pixel values (e.g., B5-1, B5-2, B5-3, and B5-4) of 4 sub-pixels of the secondary pixel. When the OSD image data is broken up and rearranged in the system end, and the rearranged OSD image data is input to the control system of the display apparatus, the pixel values of the sub-pixels are compressed and stored in the memory of the system end circuits, and are not arranged in an order in which they are displayed. Therefore, there is a need to parse to rearrange the OSD image data, i.e., the OSD image sub-data of 5 viewpoints, in the control system of the display apparatus.

TABLE 1

Display data included in the OSD image sub-data of 5 viewpoints

| Viewpoint | The display data included in the OSD image sub-data of this viewpoint |
|---|---|
| First viewpoint | R1-1, R2-1, R3-1, R4-1, G1-1, G2-1, G3-1, G4-1, B1-1, B2-1, B3-1, B4-1 |
| Second viewpoint | R1-2, R2-2, R3-2, R4-2, G1-2, G2-2, G3-2, G4-2, B1-2, B2-2, B3-2, B4-2 |
| Third viewpoint | R1-3, R2-3, R3-3, R4-3, G1-3, G2-3, G3-3, G4-3, B1-3, B2-3, B3-3, B4-3 |
| Fourth viewpoint | R1-4, R2-4, R3-4, R4-4, G1-4, G2-4, G3-4, G4-4, B1-4, B2-4, B3-4, B4-4 |
| Fifth viewpoint | R1-5, R2-5, R3-5, R4-5, G1-5, G2-5, G3-5, G4-5, B1-5, B2-5, B3-5, B4-5 |

All the sub-pixels in the OSD image sub-data of the 5 viewpoints are rearranged, that is, red secondary pixels, green secondary pixels and blue secondary pixels in the OSD image sub-data of the 5 viewpoints are rearranged. After rearrangement, all the sub-pixels of the red secondary pixels in the OSD image sub-data of the 5 viewpoints are arranged in at least one row and parallel to one other, all the sub-pixels of the blue secondary pixels in the OSD image sub-data of the 5 viewpoints are arranged in at least one row and parallel to one other, and all the sub-pixels of the green secondary pixels in the OSD image sub-data of the 5 viewpoints are arranged in at least one row and parallel to one other. Any sub-pixel of the red secondary pixels in the OSD image sub-data of the 5 viewpoints is arranged in different rows from any sub-pixel of the blue secondary pixels in the OSD image sub-data of the 5 viewpoints or any sub-pixel of the green secondary pixels in the OSD image sub-data of the 5 viewpoints. That is, different secondary pixels in the rearranged OSD image sub-data are located in different rows.

For example, as shown in Table 2, the rearranged OSD image sub-data corresponding to 5 viewpoints includes pixel values of 12 rows of sub-pixels, and the pixel values R1-1, R1-2, R1-3, R1-4 and R1-5 of the sub-pixels of the red secondary pixels in the OSD image sub-data of the 5 viewpoints are arranged in a first row; the pixel value R1-1 of the sub-pixel corresponds to the start location DO of the to-be-displayed region 20. The pixel values G1-1, G1-2, G1-3, G1-4, and G1-5 of the sub-pixels of the green secondary pixels in the OSD image sub-data of the 5 viewpoints are arranged in a second row. The pixel values B1-1, B1-2, B1-3, B1-4, and B1-5 of the sub-pixels of the blue secondary pixels in the OSD image sub-data of the 5 viewpoints are arranged in a third row. By analogy, the pixel values R4-1, R4-2, R4-3, R4-4 and R4-5 of the sub-pixels of the red secondary pixels in the OSD image sub-data of the 5 viewpoints are arranged in a tenth row. The pixel values G4-1, G4-2, G4-3, G4-4 and G4-5 of the sub-pixels of the green secondary pixels in the OSD image sub-data of the 5 viewpoints are arranged in an eleventh row. The pixel values B4-1, B4-2, B4-3, B4-4 and B4-5 of the sub-pixels of the blue secondary pixels in the OSD image sub-data of the 5 viewpoints are arranged in a 12-th row, and the pixel value R4-5 of the sub-pixel corresponds to the end location D1 of the to-be-displayed region 20.

TABLE 2

| Rearranged OSD image sub-data | | | | |
|---|---|---|---|---|
| Row | Rearranged OSD image sub-data | | | |
| 1 | R1-1 | R1-2 | R1-3 | R1-4 | R1-5 |
| 2 | G1-1 | G1-2 | G1-3 | G1-4 | G1-5 |
| 3 | B1-1 | B1-2 | B1-3 | B1-4 | B1-5 |
| ... | | ... | | |
| 10 | R4-1 | R4-2 | R4-3 | R4-4 | R4-5 |
| 11 | G4-1 | G4-2 | G4-3 | G4-4 | G4-5 |
| 12 | B4-1 | B4-2 | B4-3 | B4-4 | B4-5 |

It will be understood that, the pixel values G1-1, G1-2, G1-3, G1-4, and G1-5 of the sub-pixels of the green secondary pixels in the OSD image sub-data of the 5 viewpoints may also be arranged in the first row; alternatively, the pixel values B11-1, B1-2, B1-3, B1-4 and B1-5 of the sub-pixels of the blue secondary pixels in the OSD image sub-data of the 5 viewpoints are arranged in the first row. The sequence of the row where the sub-pixels of the red secondary pixels in the OSD image sub-data of n viewpoints are located, the row where the sub-pixels of the green secondary pixels in the OSD image sub-data of n viewpoints are located, and the row where the sub-pixels of the blue secondary pixels in the OSD image sub-data of n viewpoints are located is not limited in the disclosure. That is to say, an order of the rearranged secondary pixels varies, as long as different secondary pixels are located in different rows after rearrangement, which are within the protection scope of the embodiments of the present disclosure. The OSD image sub-data of n viewpoints are rearranged, and thus, it is ensured that different sub-pixels are located in different rows after rearrangement, thereby ensuring a good 3D display effect, and ensuring that the 3D scene presented in front of the user is realistic.

In step 203, the to-be-displayed region 20 corresponding to the OSD image data of the display screen 10 is determined according to the location information of the OSD image data, and rearranged OSD image data is displayed in the to-be-displayed region 20. The to-be-displayed region 20 includes at least one display sub-region 11, and the rearranged OSD image data includes rearranged OSD image sub-data of part or all of viewpoints.

In some embodiments, as shown in FIG. 1, the location information of the OSD image data includes the start location DO of the to-be-displayed region 20 of the OSD image, and length information and width information of the to-be-displayed region 20 of the OSD image. The end location D1 of the to-be-displayed region 20 of OSD may be obtained according to the start location DO of the to-be-displayed region 20 of the OSD image, and the length information and width information of the to-be-displayed region 20 of the OSD image. The system end circuits may configure or generate, according to the display screen 10, coordinates of the start location DO of the to-be-displayed region 20 of the OSD image, the length information and width information of the to-be-displayed region 20 of the OSD image, the position of the display sub-region 11 to which the OSD image data belongs, and other parameters. When data stream of the display apparatus reaches the start location DO of the to-be-displayed region 20 of the OSD image, the rearranged OSD image sub-data of the 5 viewpoints will be output to the to-be-displayed region 20 of OSD according to a timing sequence, and the OSD image of the 5 viewpoints will be displayed.

For example, the rearranged OSD image data may also include OSD image sub-data of some viewpoints. For example, when the rearrangement is performed, only OSD image sub-data of 3 viewpoints in the OSD image sub-data of 5 viewpoints are rearranged. Thus, when the data stream of the display apparatus reaches the start location DO of the to-be-displayed region 20 of the OSD image, the rearranged OSD image sub-data of the 3 viewpoints will be output to the to-be-displayed region 20 of OSD according to a timing sequence, and the OSD image of the 3 viewpoints will be displayed. For another example, when the rearrangement is performed, although the OSD image sub-data of the 5 viewpoints are rearranged, only the image sub-data of 3 viewpoints may be displayed during display.

In some embodiments, the to-be-displayed image data further includes source image data, and the display method further includes: parsing the source image data, and performing data rearrangement on the parsed source image data.

Figure 7B:
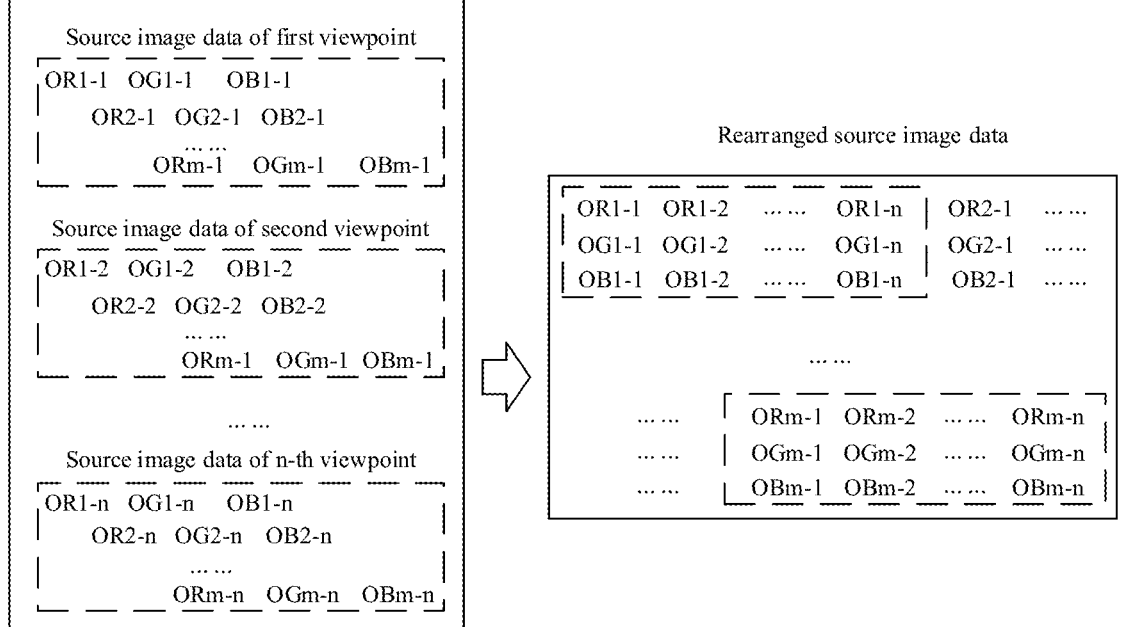
FIG. 7B is an arrangement diagram of source image data before and after rearrangement, in accordance with some embodiments.

For example, the source image data may also include the source image data from multiple viewpoints, and the acquisition method of the source image data is not limited in the embodiments of the present disclosure. As shown in FIG. 7B, the source image data includes the source image data of n viewpoints, and image sub-data of each viewpoint includes A secondary pixels. It will be understood that in order to ensure the visual effect, the type and number of the secondary pixels included in the source image data of each viewpoint are respectively the same as the type and number of secondary pixels included in the OSD image sub-data of each viewpoint. Each secondary pixel of the source image data of each viewpoint includes m sub-pixels, and m is an integer greater than or equal to 1. It will be understood that a value of m and a value of t, in the above description that each secondary pixel of each OSD image sub-data includes t sub-pixels, may be the same or different.

In addition, the display range of the source image may be the entire display screen 10 or a partial display region of the display screen 10. Some embodiments of the present disclosure are described by taking an example in which the display range of the source image is the entire display screen 10. The method of parsing and rearranging the source image data is similar to the method of parsing and rearranging the OSD image data, which will not be repeated here.

As shown in FIG. 7B, in an example in which the parsed source image data includes the source image data of n viewpoints, the source image data of each viewpoint includes 3 secondary pixels, and the 3 secondary pixels are a red secondary pixel, a green secondary pixel and a blue secondary pixel, respectively. In the source image data of each viewpoint, each red secondary pixel includes m sub-pixels, such as sub-pixels OR1-1, OR2-1, . . . , ORm-1; each green secondary pixel includes m sub-pixels, such as sub-pixels OG1-1, OG2-1, . . . , OGm-1; and each blue secondary pixel includes m sub-pixels, such as sub-pixels OB1-1, OB2-1, . . . , OBm-1.

When the rearrangement is performed, as shown in FIG. 7B, according to a display parameter corresponding to each display data, such as a pixel value of the sub-pixel, of the source image data, and the corresponding display parameter, the rearrangement is performed according to location information of the display data. For example, in the rearranged source image data, the display data OR1-1 corresponds to a start location of the display screen 10, and the display data ORm-n corresponds to an end location of the display screen 10. As shown in FIG. 1, it will be understood that when the display screen 10 is in a shape of a rectangle, a position where a first pixel at the upper left corner of the rectangle is located is the start location of the display screen 10, and a position where a last pixel at the lower right corner of the rectangle is the end location of the display screen 10. In this way, when the rearranged source image data is time-series controlled input to the display screen 10, it will be displayed according to the rearranged source image data.

The rearranged source image data will be described more intuitively by taking an example in which the parsed source image data includes source image data of 5 viewpoints, source image data of each viewpoint includes 3 secondary pixels, each secondary pixel includes 4 sub-pixels, the display screen 10 includes 12 rows*5 columns of pixels, and the pixels are in one-to-one correspondence with the pixel values of the sub-pixels in the source image data. The rearranged source image data is shown in Table 3. The pixel value OR1-1 of the sub-pixel corresponds to the first pixel at the upper left corner of the display screen 10, and the pixel value OB4-5 of the sub-pixel corresponds to the last pixel at the lower right corner of the display screen 10.

TABLE 3

| Rearranged source image data | | | | | |
| --- | --- | --- | --- | --- | --- |
| Row | Rearranged source image data | | | | |
| 1 | OR1-1 | OR1-2 | OR1-3 | OR1-4 | OR1-5 |
| 2 | OG1-1 | OG1-2 | OG1-3 | OG1-4 | OG1-5 |
| 3 | OB1-1 | OB1-2 | OB1-3 | OB1-4 | OB1-5 |
| . . . | | | . . . | | |
| 10 | OR4-1 | OR4-2 | OR4-3 | OR4-4 | OR4-5 |
| 11 | OG4-1 | OG4-2 | OG4-3 | OG4-4 | OG4-5 |
| 12 | OB4-1 | OB4-2 | OB4-3 | OB4-4 | OB4-5 |

In some embodiments, as shown in FIG. 1, the display region of the display screen 10 is larger than the to-be-displayed region 20 of the OSD image. In this case, when both the source image and the OSD image need to be displayed on the display screen 10, according to the to-be-displayed region 20 corresponding to the OSD image data of the display screen 10, displaying the rearranged OSD image data in the to-be-displayed region 20 includes: according to the to-be-displayed region 20 corresponding to the OSD image data of the display screen 10, replacing the rearranged source image data corresponding to the to-be-displayed region 20 with the rearranged OSD image data, or superposing the rearranged OSD image data on the rearranged source image data corresponding to the to-be-displayed region 20.

Figure 7C:
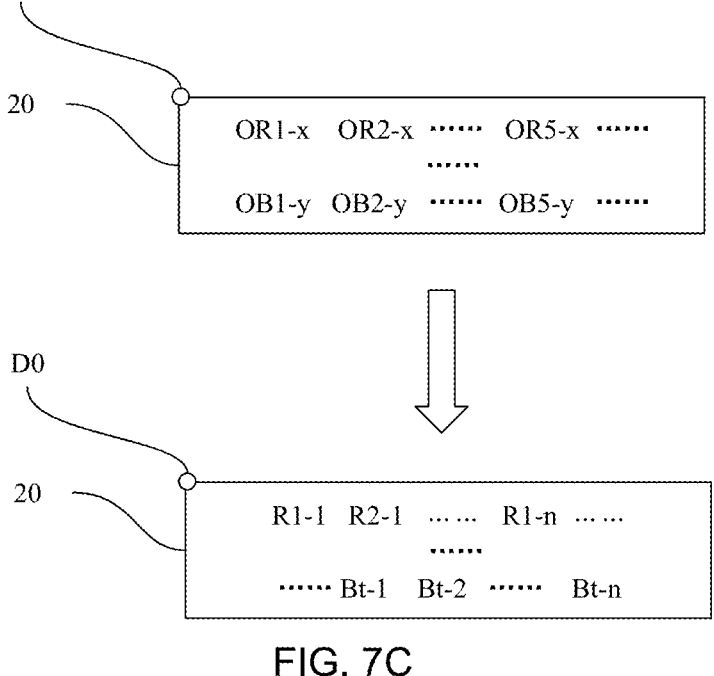
FIG. 7C is a schematic diagram showing a replacement of display data of a to-be-displayed region of OSD, in accordance with some embodiments.
Figure 7D:
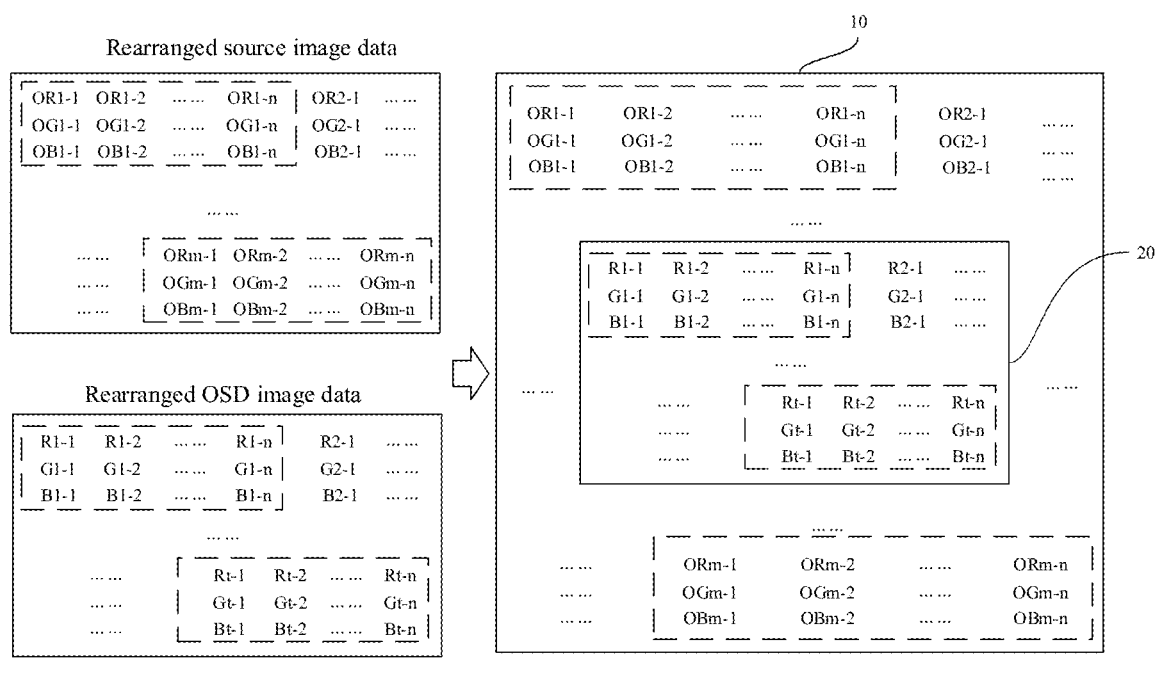
FIG. 7D is an arrangement diagram of display data on a display screen, in accordance with some embodiments.

For example, as shown in FIGS. 7C and 7D, the rearranged source image data (e.g., OR1-$x$ and OR1-$y$, where x and y are both an integer less than or equal to m), of which location information is in the to-be-displayed region 20 of the OSD image, is directly replaced with the rearranged OSD image data (e.g., R1-1 and R1-2). For example, the display data OR1-$x$ of the start location DO is replaced with R1-1. That is, in the to-be-displayed region 20 of the OSD image, the source image is not displayed, but only the OSD image is displayed.

For example, before the data stream reaches the start location DO of the to-be-displayed region 20 of the OSD image, the display data of the to-be-displayed region 20 of OSD is the rearranged source image data as shown in FIG. 7B; when the data stream reaches the start location DO of the to-be-displayed region 20 of the OSD image, starting from the start location DO, the rearranged OSD image data shown in FIG. 7A is used as the display data of the to-be-displayed region 20 of the OSD image. That is, in the to-be-displayed region 20 of the OSD image, the corresponding rearranged source image data is replaced with the rearranged OSD image data. Therefore, as shown in FIG. 7D, the to-be-displayed region 20 of OSD of the display screen 10 displays the rearranged OSD image data, and a region, other than the to-be-displayed region 20, of the display screen 10 displays the rearranged source image data.

Figure 7E:
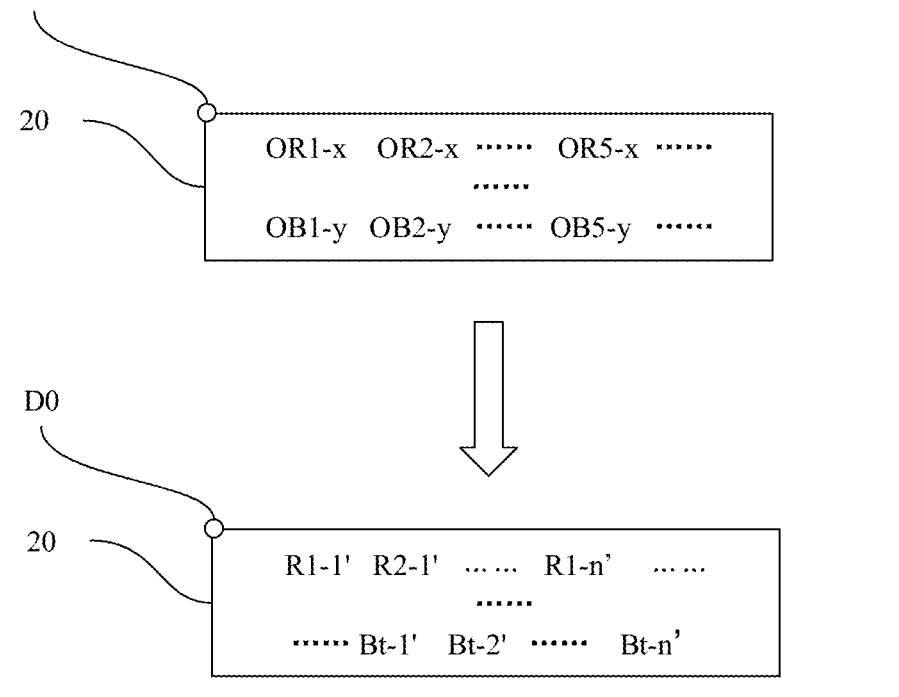
FIG. 7E is a schematic diagram showing another replacement of display data of a to-be-displayed region of OSD, in accordance with some embodiments.
Figure 7F:
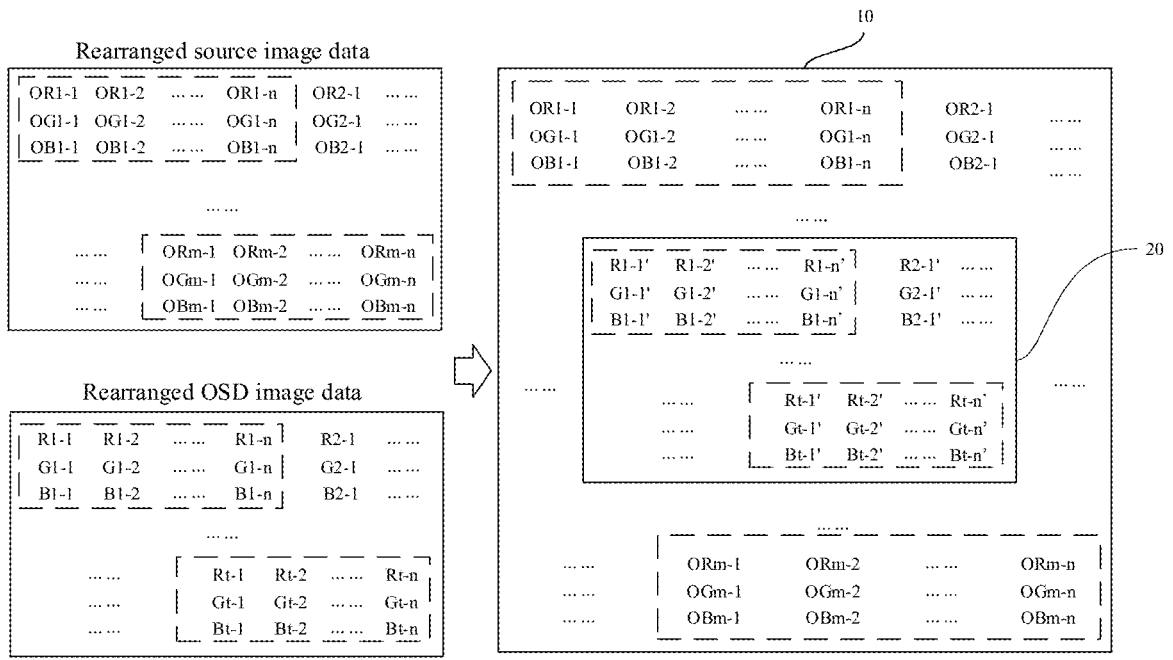
FIG. 7F is an arrangement diagram of display data on a display screen, in accordance with some embodiments.

In some embodiments, as shown in FIGS. 7E and 7F, in a case where the rearranged OSD image data is superimposed on the rearranged source image data corresponding to the to-be-displayed region 20 of the OSD image, the to-be-displayed region 20 of OSD displays an image after the source image is fused with the OSD image.

In some embodiments, the superposition method may include setting transparency for the rearranged OSD image data, and superimposing the rearranged OSD image data after setting transparency on the rearranged source image data corresponding to the to-be-displayed region 20. For example, as shown in FIG. 7E, as for the display data of the start location DO of the to-be-displayed region 20 of the OSD image, the display data OR1-$x$ of the source image at this position is replaced with R1-1'; R1-1' is obtained by superimposing the rearranged OSD image data R1-1 after setting transparency on the source image data OR1-$x$, R1-2' is obtained by superimposing the rearranged OSD image data after setting transparency on the source image data OR2-$x$, and so on.

For example, before the data stream reaches the start location DO of the to-be-displayed region 20 of the OSD image, the display data of the to-be-displayed region 20 of OSD is the rearranged source image data as shown in FIG. 7B; when the data stream reaches the start location DO of the to-be-displayed region 20 of the OSD image, as shown in FIG. 7E, superimposed display data is obtained by superimposing the rearranged OSD image data on the rearranged source image data corresponding to the to-be-displayed region 20 of the OSD image, and from the start location DO of the to-be-displayed region 20 of the OSD image, the superimposed display data is used as the display data of the to-be-displayed region 20 of the OSD image. Therefore, as shown in FIG. 7F, the to-be-displayed region 20 of OSD of the display screen 10 displays the image data after the OSD image is superimposed on the source image, and the region, other than the to-be-displayed region 20 of the OSD image, of the display screen 10 displays the rearranged source image data.

Figure 8:
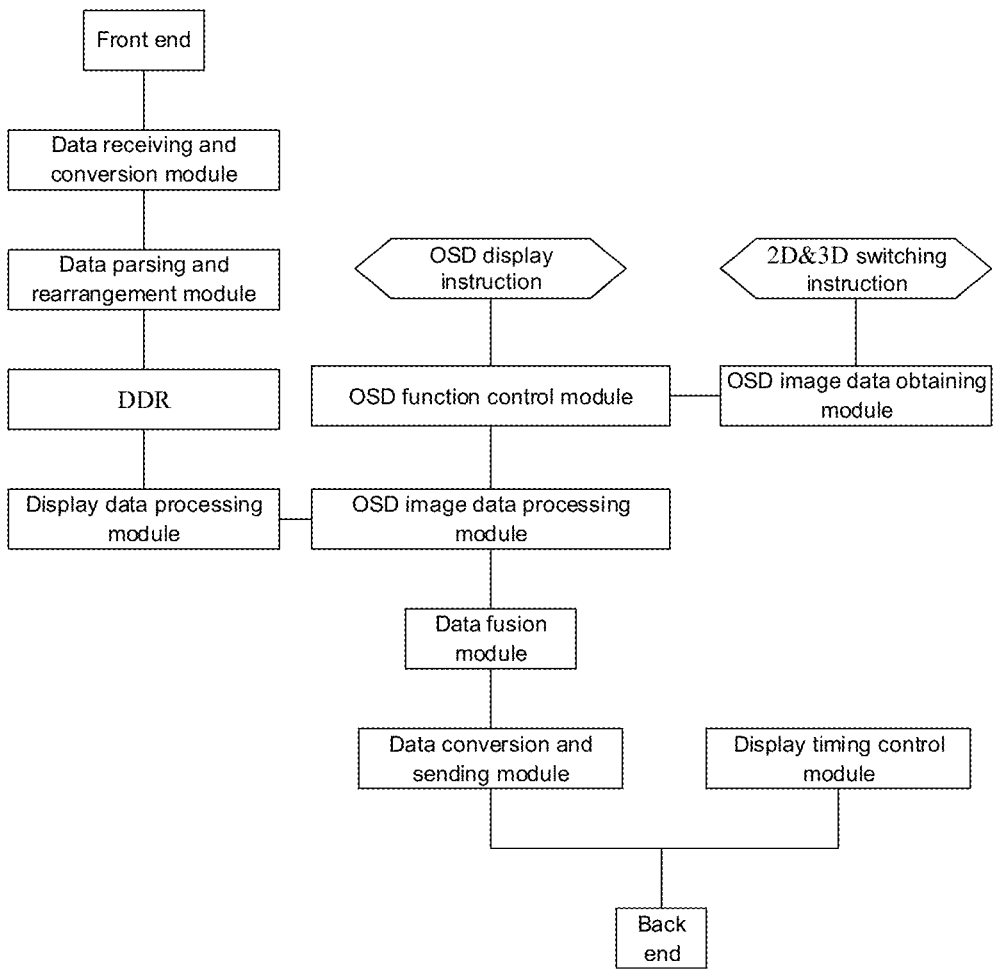
FIG. 8 is a flow diagram of another display method, in accordance with some embodiments.
Figure 9:
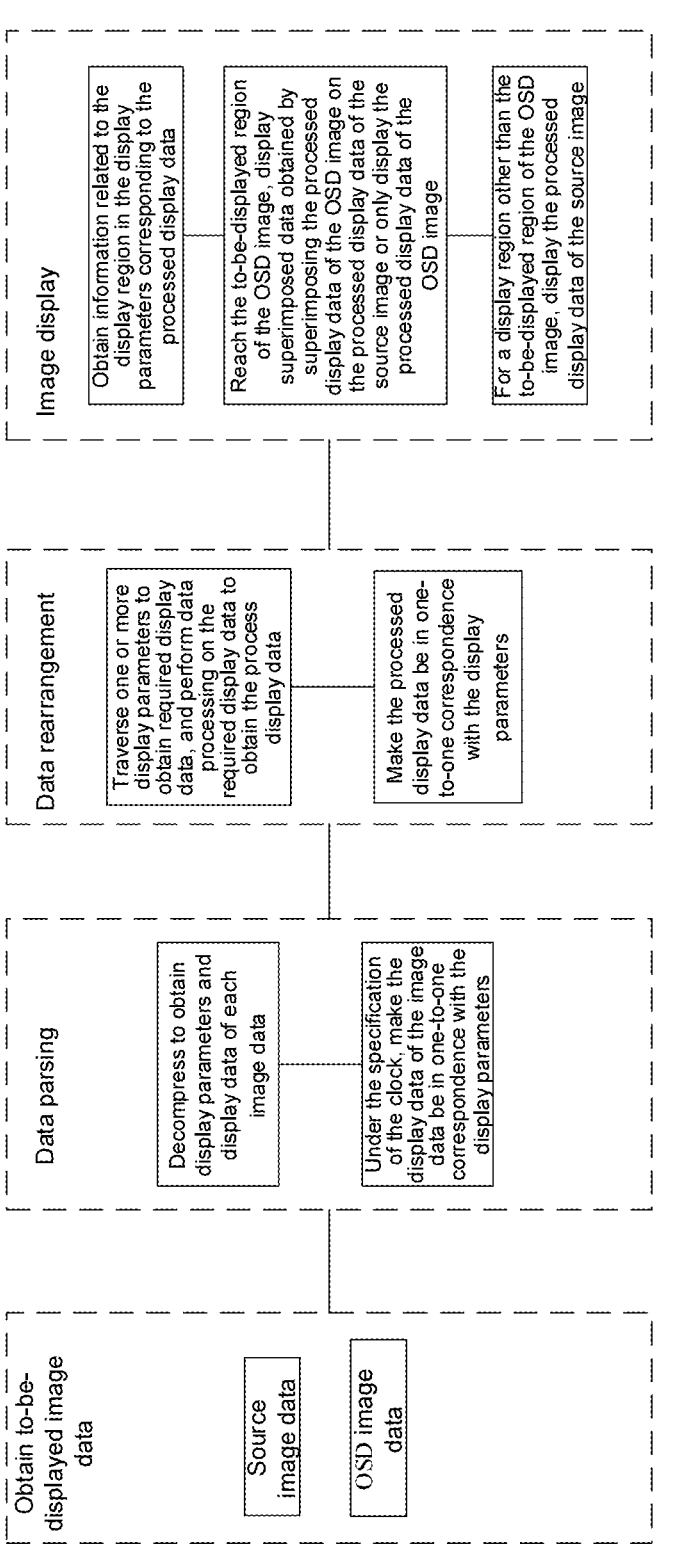
FIG. 9 is a flow diagram of yet another display method, in accordance with some embodiments.

In some embodiments, an overall process in which the source image and the OSD image are both need to be displayed is described by taking FIGS. 8 and 9 as an example.

As shown in FIG. 8, firstly, a front end transmits the source image data through data interfaces, and the front end may be a certain part of the system end or an external device. The number and type of the front end is not limited in the present disclosure. There may be multiple data interfaces. For example, the data interfaces may include any one or more of a system interface, an internal interface, a display port, a high-definition multimedia interface (HDMI), an external/embedded display port, or the mobile industry processor interface. Data source of the source image and the type of data interfaces are not limited in the present disclosure. After receiving the source image data, a data receiving and conversion module at the system end outputs the converted source image data to a data parsing and rearrangement module, and the source image data after data parsing and rearrangement are performed is stored in a double data rate synchronous dynamic random access memory (DDR, which also be abbreviated as DDR SDRAM) in the system end circuit. When the source image data needs to be displayed, it may be possible to call the rearranged source image data from DDR, and perform data processing on the display data of the rearranged source image data, the data processing may include adjustment for a specific pixel value. If there is no OSD display instruction at this time, the processed display data of the source image may be directly output to a data conversion and sending module to output to a back end, and the source image is displayed under a control of a display timing. The back end may be the display screen 10 of the display apparatus, or the driving circuit of the display apparatus, and the type of the back end and the number of the back ends are not limited in the present disclosure.

For example, when a user end issues an OSD display instruction, the system end reads a switching instruction between 2D display and 3D display, and controls an OSD image data obtaining module through an OSD function control module to obtain OSD image data corresponding to 2D display or 3D display. The obtained OSD image data is output to an OSD image data processing module, and the OSD image data processing module processes the obtained OSD image data, the processing including pursing and arrangement for the OSD image data, so as to obtain the processed OSD image data. The processed display data of the source image and the processed display data of the OSD image are output to a data fusion module for data fusion, and the fused display data of the source image and the display data of the OSD image are output to the back end through the data conversion and sending module. The fused display data of the source image and the display data of the OSD image may be stored in a storage medium, such as an electrically erasable programmable read-only memory (EEPROM), a flash memory (Flash), and a read-only memory (ROM) of the display apparatus. When there is a need to display, the fused data is output from the storage medium, and the source image and the OSD image are displayed under the control of the display timing. A manner of data fusion of the processed display data of the source image and the processed display data of the OSD image may be replacement or superimposition.

FIG. 9 is considered as an example to describe how the source image data and the OSD image data are converted into display data on the display screen 10 to be displayed on the display screen 10.

Firstly, to-be-displayed image data is obtained, the to-be-displayed image data includes the source image data and the OSD image data, and the OSD image data may be obtained from the memory of the system end circuit; as shown in FIG. 8, the source image data may be obtained by the front end. Then, during data pursing, the data pursing is performed on the source image data and the OSD image data, and the pursing includes decompression; display parameters of the source image data and the display data corresponding to the display parameters of the source image data, and display parameters of the OSD image data and the display data corresponding to the display parameters of the OSD image data may be obtained respectively by decompression; and then, under the specification of the clock, the display data of the image data is in one-to-one correspondence with the display parameters.

Next, data rearrangement is performed, and one or more display parameters of the source image data and one or more display parameters of the OSD image data are respectively traversed to obtain required display data; and the required display data may be display data of a certain region. Then, data processing is performed on the required display data. A manner of the data processing may be adjustment for the pixel value, such as increase or decrease due to a rendering operation. Thus, the processed display data may be obtained, and the processed display data may be different from the display data of the OSD image stored in the system end circuit. Then, the processed display data is made be in one-to-one correspondence with the display parameters.

Finally, when an image is displayed, information related to the display region in the display parameters corresponding to the processed display data is obtained firstly; that is, the display region corresponding to the processed display data is obtained. When the data stream of the processed display data reaches the start location DO of the to-be-displayed region 20 of the OSD image, the superimposed data obtained by superimposing the processed display data of the OSD image on the processed display data of the source image may be displayed, or only the processed display data of the OSD image is displayed; for a display region, other than the to-be-displayed region 20 of OSD, of the display screen 10, the processed display data of the source image may be directly displayed.

It will be understood that the source image data and the OSD image data, the parsed source image data and the parsed OSD image data, the rearranged source image data and the rearranged OSD image data, the processed source image data and the processed OSD image data, and the fused data may be stored in the memory of the system end circuit or in the memory of the display apparatus, so as to be called or used directly next time. Although the present disclosure is described by taking an example in which the OSD image data is stored in the memory of the system end circuit, it does not limit that in actual use, the OSD image is displayed only based on the OSD image data stored in the system end circuit, and does not limit that in the actual use, whether the source image data and the OSD image data must be parsed, rearranged, processed and fused. That is to say, when the memory of the system end circuit or the memory of the display apparatus stores the parsed source image data and the parsed OSD image data, the rearranged source image data and the rearranged OSD image data, the processed source image data and the processed OSD image data, and the fused data, the required data may be called or directly used according to actual needs.

In some embodiments, as shown in FIG. 10, the display method further includes following steps.

In step 1001, a first instruction is acquired, the first instruction is used to switch the display mode of the OSD image from 3D display to 2D display, or switch the display mode of the OSD image from 2D display to 3D display.

For example, the first instruction may be an enable signal EN for switching between 3D display and 2D display. When the OSD image needs to be displayed, the enable signal can be used to switch from 3D display to 2D display, or from 2D display to 3D display. A manner of acquiring the first instruction is not limited in the present disclosure. For example, the enable signal may be provided by a switch button on an operating handle held or a remote controller of a user owned, and each time the user presses the switch button, the 3D display and the 2D display switch once. For example, when the button is not pressed, the enable signal is set low, the system end acquires the first instruction, and switches the display mode of the OSD image to 2D display, so that the display mode of the OSD image is 2D display. When the user presses the switch button, the enable signal is set high, the system end acquires the first instruction, and switches the display mode of the OSD image to 3D display, so that the display mode of the OSD image is 3D display. For example, the enable signal EN may also be generated by the system end. For example, the system end automatically switches between 2D display and 3D display after determining that a certain parameter or multiple parameters meet a certain preset condition.

In step 1002, in response to the first instruction, two-dimensional OSD image data or three-dimensional OSD image data is obtained.

For example, the two-dimensional OSD image data is obtained by performing a de-3D data process on the OSD image sub-data of n viewpoints. When the system end acquires the first instruction, the OSD image sub-data of n viewpoints in the memory of the system end circuit may be called to be performed the de-3D data process, so that two-dimensional OSD image data is obtained. For example, the two-dimensional OSD image data may be stored in the memory of the system end circuit, and when the system obtains the first instruction, the two-dimensional OSD image data in the memory of the system end circuit may be called. For example, the two-dimensional OSD image data may be OSD image sub-data of a certain viewpoint of the OSD image sub-data of n viewpoints. When the system end obtains the first instruction, the OSD image sub-data of the certain viewpoint of the OSD image sub-data of n view-points may be directly called. A manner of obtaining the two-dimensional OSD image data is not limited in the present disclosure. The three-dimensional OSD image data includes the OSD image sub-data of n viewpoints, which may be obtained by taking pictures of multiple viewpoints of the first OSD model, or may be obtained in real time through the second OSD model.

In step 1003, a two-dimensional OSD image is displayed on the display screen according to the to-be-displayed region corresponding to the two-dimensional OSD image data; or a three-dimensional OSD image is displayed on the display screen according to the to-be-displayed region corresponding to the three-dimensional OSD image data.

For example, the to-be-displayed region 20 corresponding to the two-dimensional OSD image data may be configured or generated by the system end, and pixel values of sub-pixels included in each secondary in the two-dimensional OSD image data is output to the to-be-displayed region 20 according to the display timing, so that the two-dimensional OSD image is displayed in the to-be-displayed region 20.

In some embodiments, as shown in FIG. 11, the display method further includes following steps.

In step 1101, a face image or pupil image of a user is acquired, and a main viewing region of the user is determined; and/or a gesture image of the user is acquired, and a main viewpoint region of the user is determined.

Figure 12:
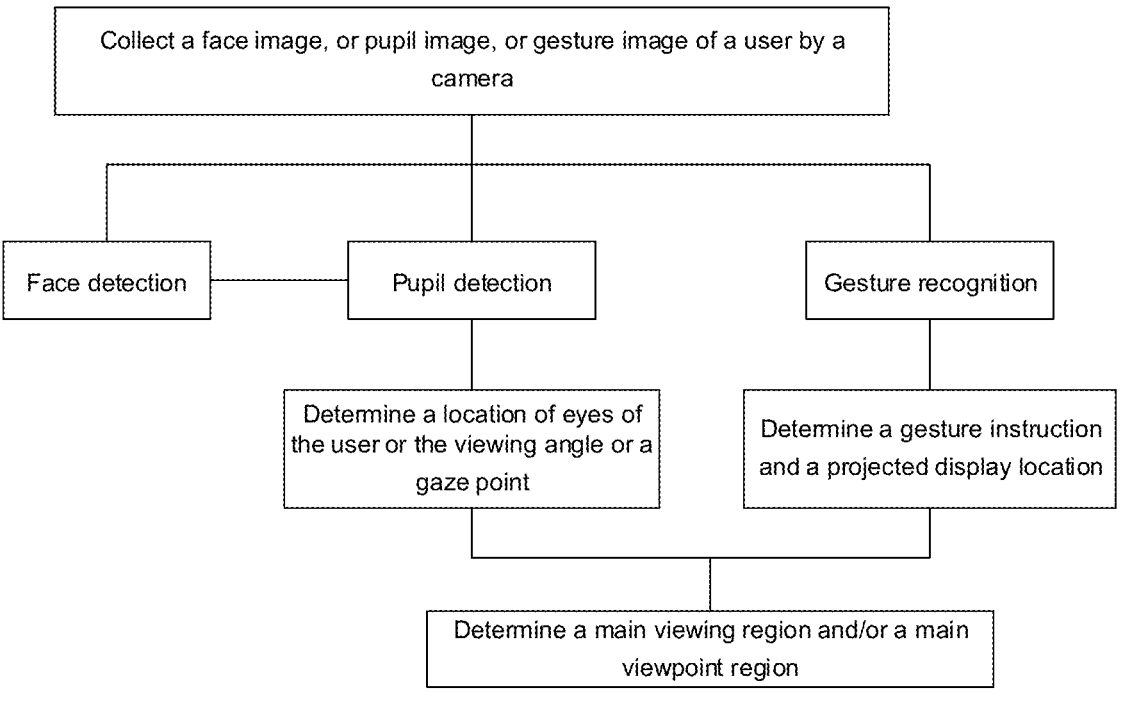
FIG. 12 is a flow diagram of yet another display method, in accordance with some embodiments.

For example, as shown in FIG. 12, the face image, or pupil image, or gesture image of the user may be collected by a camera, and the camera may be a visible light camera and/or an infrared camera. The collection manner of the face image, or pupil image, or gesture image of the user is not limited in the present disclosure.

Figure 13:
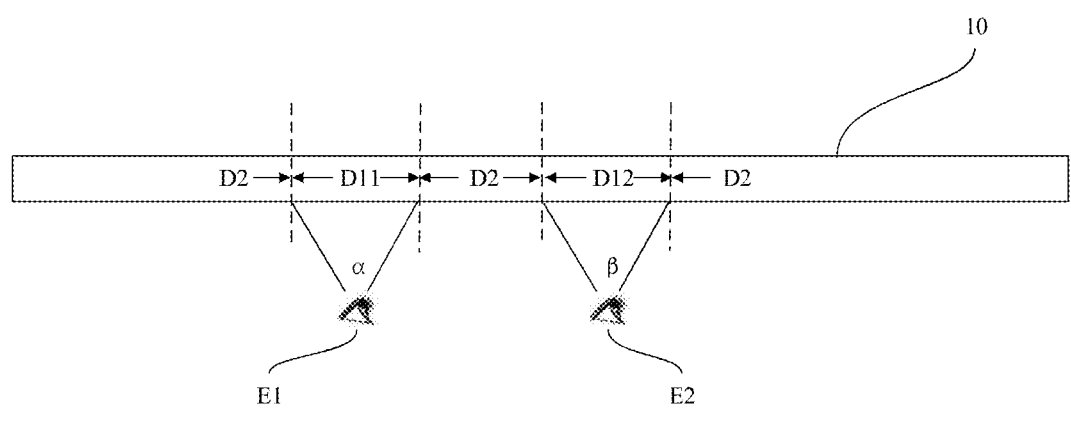
FIG. 13 is a schematic diagram form main viewing regions, in accordance with some embodiments.

For example, considering the manner of camera collection as an example, it is possible to perform a data processing of face detection on the collected face image of the user, and then perform pupil detection; as shown in FIG. 13, a location of eyes of the user and a viewing angle relative to the screen are analyzed to determine the location (e.g., location E1 or E2) of eyes of the user or the viewing angle (e.g., viewing angle $\alpha$ or $\beta$) or a gaze point. Alternatively, it is possible to directly perform an image processing of pupil detection on the collected pupil image of the user, and analyze a location of eyes of the user and a viewing angle relative to the screen to determine the location (e.g., location E1 or E2) of eyes of the user or the viewing angle (e.g., viewing angle $\alpha$ or $\beta$) or the gaze point. For example, feature points are obtained by face recognition to obtain coordinates of a center of eyebrows, and then coordinates (e.g., E1 and E2) of eyes of the user are obtained according to a distance between the center of the eyebrows and the eyes of the user to determine the location of the eyes of the user. For example, according to the coordinates of the center of the eyebrows, an angle (e.g., angle $\alpha$ or $\beta$) between the coordinates of the center of the eyebrows and a lateral boundary of each display sub-region 11 in the display region of the OSD image is calculated to determine the viewing angle of the user or gaze point. The main viewing region D11 of the user is determined by the location E1 of the eyes of the user or the viewing angle $\alpha$ or the gaze point; the main viewing region D12 of the user is determined by the location E2 of the eyes of the user or the viewing angle $\beta$ or the gaze point. A region D2 of the display screen 10 is a display region other than the main viewing region D11 and the main viewing region D12.

For example, as shown in FIG. 12, a gesture recognition process may be performed on the collected gesture pictures of the user, and a motion or a motion trend of the gesture of the user may be analyzed to determine a gesture instruction and a projected display location. Therefore, it may be possible to determine which viewpoint region the user is primarily focused on when interacting with the OSD image on the display screen 10, so that the main viewing region of the user is determined.

In step 1102, high-definition display of OSD image data and/or source image data of the main viewing region and/or the main viewpoint region is performed. Low-definition display of OSD image data and/or source image data outside of the main viewing region and/or the main viewing region is performed.

For example, as shown in FIG. 13, high-definition display is performed on the OSD image data and/or source image data displayed in the main viewing region D11 and the main viewing region D12. Low-definition display is performed on the OSD image data and/or source image data on the region D2 of the display screen 10.

Figure 14:
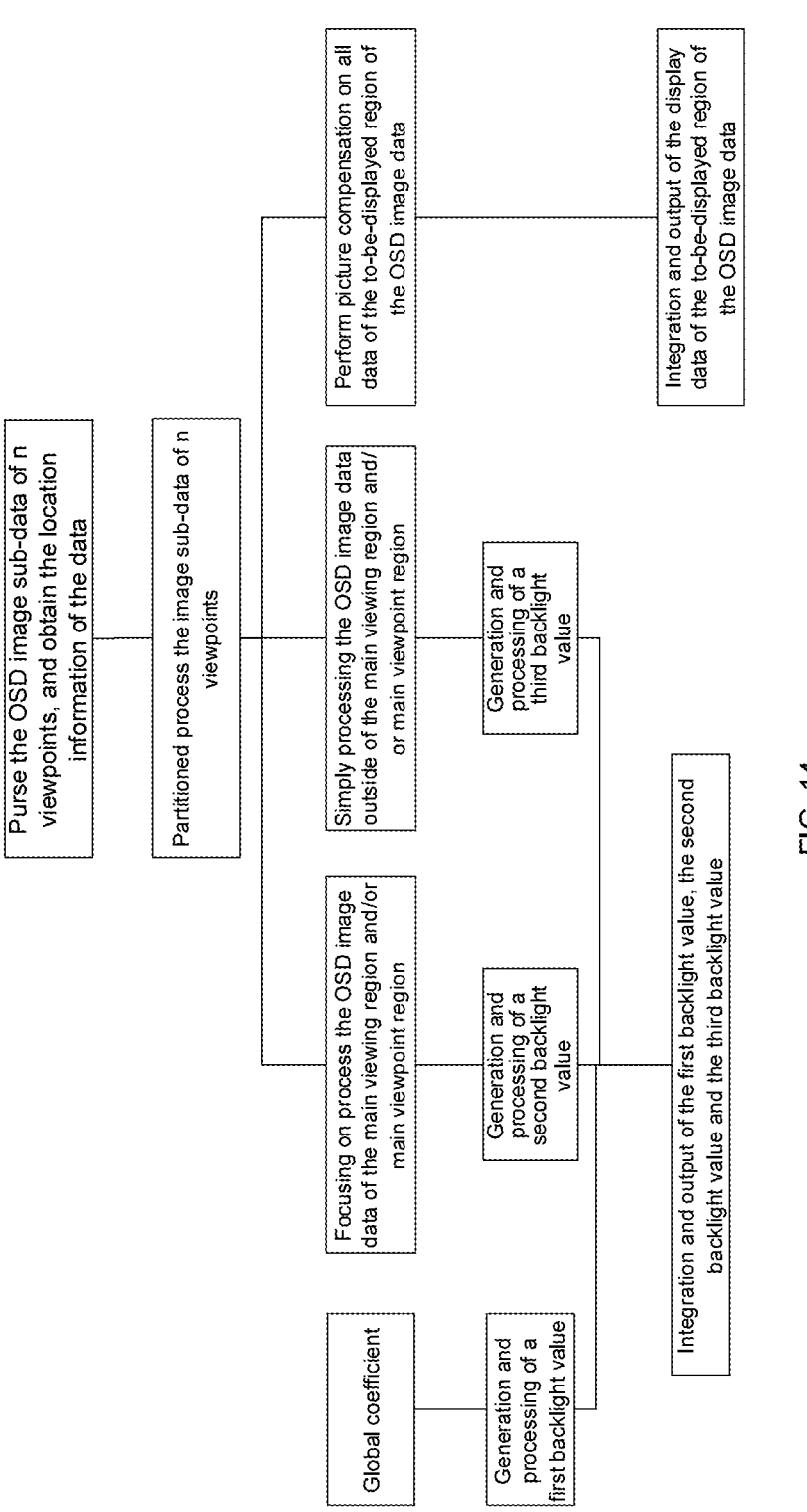
FIG. 14 is a flow diagram of yet another display method, in accordance with some embodiments.

For example, as shown in FIG. 14, after pursing the image sub-data of n viewpoints and obtaining the location information of the data, the image sub-data of n viewpoints are partitioned processed. Thus, high-definition display of the OSD image data and/or source image data of the main viewing region and/or main viewpoint region, and low-definition display of the OSD image data and/or source image data outside of the main viewing region and/or main viewpoint region are achieved.

For example, high-definition display of the OSD image data and/or source image data of the main viewing region and/or the main viewpoint region may be performed by focusing on processing the OSD image data and/or source image data of the main viewing region and/or main viewpoint region, and the processing may include focusing on adjusting the image quality and color temperature of the OSD image and/or the source image. For example, the number of rendering layers of the OSD image data and/or source image data of the main viewing region and/or main viewpoint region is increased, or complexity of the second OSD model generated in real time in the main viewing region and/or main viewpoint region is increased, or the OSD image sub-data and/or source image data of all viewpoints of the main viewing region and/or main viewpoint region in the system end circuit is called, or the OSD image data and/or source image data of the main viewing region and/or main viewpoint region is not compressed when transmitting to the display screen 10. The processing may also include focusing on adjusting the display brightness of the main viewing region and/or main viewpoint region. The specific manner of focusing on processing the OSD image data and/or source images of the main viewing region and/or main viewpoint region to achieve the high-definition display of the OSD image data and/or source images of the main viewing region and/or main viewpoint region is not limited in the present disclosure.

For example, low-definition display of the OSD image data and/or source image data outside of the main viewing region and/or main viewpoint region may be performed by simply processing the OSD image data and/or source image data outside of the main viewing region and/or main viewpoint region, and the simple processing may include simple adjusting the image quality and color temperature of the OSD image and/or the source image. For example, the number of rendering layers of the OSD image data and/or source image data outside of the main viewing region and/or main viewpoint region is reduced, or complexity of the second OSD model generated in real time in the main viewing region and/or main viewpoint region is reduced, or the OSD image sub-data and/or source image data outside of the main viewing region and/or main viewpoint region called from the system end circuit is compressed, or only OSD image sub-data of some viewpoints is selected as the OSD image data and/or source image data outside of the main viewing region and/or main viewpoint region. It will be understood that the some viewpoints refers to viewpoints less than n viewpoints, that is to say, OSD image sub-data of 0 viewpoints and/or source image data of 0 viewpoints may be selected as the OSD image data and/or source image data outside of the main viewing region and/or main viewpoint region. That is, the OSD image data outside of the main viewing region and/or main viewpoint region is not displayed. The simple processing may also include simple adjusting the display brightness of the main viewing region and/or main viewpoint region. The specific manner of simply processing the OSD image data and/or source images outside of the main viewing region and/or main viewpoint region to achieve the low-definition display of the OSD image data and/or source images outside of the main viewing region and/or main viewpoint region is not limited in the present disclosure.

For example, when there is a need to adjust the image quality and color temperature of the OSD image and/or source image, different look-up-tables may be established to directly and quickly adjust the image quality through the look-up-tables. The look-up-tables may be obtained by algorithm, and are stored in the memory of the system end circuit. As for each sub-pixel, a plurality of look-up-tables may be established in each display sub-region 11, so as to achieve that the image quality of the display sub-region 11 is adjusted at different degree. For example, a certain sub-pixel is in a first display sub-region, the picture quality may be adjusted through a first look-up-table to achieve that the picture quality is adjusted simply; the certain sub-pixel is in the first display sub-region, the picture quality may be adjusted through a second look-up-table to achieve that the picture quality is adjusted complexly. The first display sub-region may be any display sub-region 11 of the display screen 10.

For example, as shown in FIG. 14, when the display brightness of the to-be-displayed region 20 of OSD needs to be adjusted, a global coefficient of brightness adjustment may be generated in the system end according to the to-be-displayed region 20 of the OSD image, and a first backlight value is generated based on the global coefficient in the to-be-displayed region 20 of the OSD image. According to the global coefficient and regional division of the display screen 10, a plurality of adjustment coefficients corresponding to a plurality of regions are generated. The adjustment coefficient may be adjusted by multiplying a first fixed parameter or adding a second fixed parameter, and a second backlight value is generated based on the adjustment coefficients of the main viewing region and/or main viewpoint region. For example, the pixel value of each sub-pixel in the main viewing region and/or main viewpoint region may be multiplied by the first fixed parameter corresponding to the main viewing region and/or main viewpoint region, or the pixel value of each sub-pixel in the main viewing region and/or main viewpoint region may be added to the second fixed parameter corresponding to the main viewing region and/or main viewpoint region, so as to change the pixel value of each sub-pixel in the main viewing region and/or main viewpoint region, and then adjust the display brightness of the OSD image and/or source image in the main viewing region and/or main viewpoint region. A third backlight value is generated based on the adjustment coefficient of the display region outside of the main viewing region and/or main viewpoint region, and its display brightness adjustment manner is similar to that of the main viewing region and/or main viewpoint region, which will not be repeated here. The first backlight value, the second backlight value and the third backlight value are integrated and output after respectively processing, so that the display brightness of the to-be-displayed region 20 of OSD of the display screen 10 may be adjusted by the backlight values. It will be understood that the display brightness of any region of the display screen 10 may be adjusted to grayscale display by the global coefficient or adjustment coefficients.

For example, a local dimming algorithm may be used to achieve high-definition display or low-definition display of different regions of the display screen 10. For example, low-definition is performed on the OSD image data and/or source image data outside of the main viewing region and/or main viewpoint region by a simple dimming algorithm such as a single algorithm, and high-definition display is performed on the OSD image data and/or source image data of the main viewing region and/or main viewpoint region by weighting of multiple algorithms of the dimming algorithms.

As shown in FIG. 14, the display brightness of the main viewing region and/or main viewpoint region is strong, while the display brightness of the display region outside of the main viewing region and/or main viewpoint region is weak, so that the visual effect may be reduced if no processing is made, and as a result, the user's experience is relatively poor. Therefore, it is possible to perform picture compensation processing on all the display data of the to-be-displayed region 20 of the OSD image; if the main viewing region and/or main viewpoint region includes multiple display sub-regions 11, cross-regional display data is processed by the transition algorithm; the cross-regional display data includes display data of the main viewing region and/or main viewpoint region. Thus, the processed display data of the to-be-displayed region 20 of OSD is output after being integrated, and it is possible to have a good visual effect at the boundary position of the main viewing region and/or main viewpoint region or the positions where the display sub-regions 11 meet.

In some embodiments, when the OSD image that needs to be displayed is OSD interactive content, the display region where the OSD interactive content is located is forced to determine as the main viewing region and/or main viewpoint region. In this case, the display brightness of the main viewing region and/or main viewpoint region is increased, and the display brightness of the display region other than the viewing region and/or main viewpoint region of the display screen 10 is reduced, which may guide the viewer to move their eyes to the OSD interactive content on the display screen 10. In this case, the OSD image data and/or source image data outside of the main viewing region and/or main viewpoint region may be directly filtered out, and high definition is performed on only the OSD image data of the main viewing region and/or main viewpoint region by using the dimming algorithm, so as to reduce the computational effort.

Figure 15:
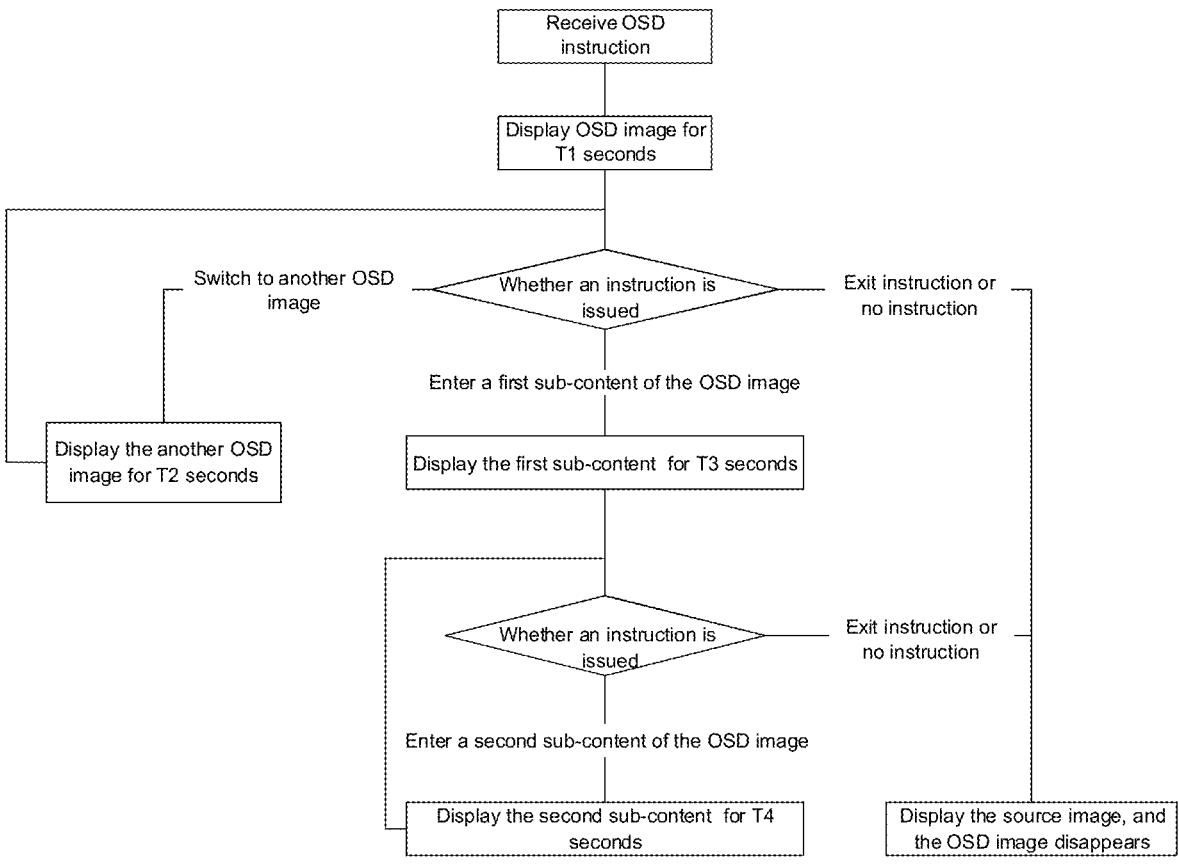
FIG. 15 is an OSD interactive flow diagram, in accordance with some embodiments.

For example, as shown in FIG. 15, the user may use the OSD image for interaction. When the system end issues a display instruction of the OSD image, the OSD image is displayed in the to-be-displayed region 20 of OSD after the display screen 10 receives the display instruction of the OSD image, and the OSD image is displayed for T1 seconds, where T1 is a positive number. If the user performs an interactive operation within T1 seconds, the display screen 10 may send the interactive operation back to the system end (e.g., a graphics card) in the form of an instruction, and the system end determines the type of the instruction, and then transmits data to the display screen 10.

For example, as shown in FIG. 15, the instruction may be a first instruction, and the first instruction is to switch to another OSD image, then the system end controls the display screen 10 of the display apparatus to display the another OSD image for T2 seconds, T2 being a positive number, and then whether an instruction is issued within T2 seconds is determined again. The instruction may also be a second instruction, and the second instruction is to enter a first sub-content of the OSD image, then the system end controls the display screen 10 of the display apparatus to display the first sub-content for T3 seconds, T3 being a positive number, then whether an instruction is issued within T3 seconds is determined again. The instruction may also be a third instruction, and the third instruction is to enter a second sub-content of the OSD image, then the system end controls the display screen 10 of the display apparatus to display the second sub-content for T4 seconds, T4 being a positive number, then whether an instruction is issued within T4 seconds is determined again. The instruction may also be a fourth instruction, and the fourth instruction is an exit instruction. In this case, the system end controls the display screen 10 of the display apparatus to display the source image, and the OSD image disappears. If no instruction is issued within T1 seconds or T2 seconds or T3 seconds or T4 seconds, the system end controls the display screen 10 of the display apparatus to display the source image, and the OSD image disappears. It will be understood that the specific values of T1, T2, T3 and T4 may be the same or different, and the specific values of T1, T2, T3 and T4 are not limited in the present disclosure. The second sub-content may be either a sub-content of the OSD image or a sub-content of the first sub-content. The sub-content of the OSD image may be any type of sub-content, and the types, the priority and levels of the first sub-content and the second sub-content are not limited in the present disclosure.

Some embodiments of the present disclosure provide a computer-readable storage medium (e.g., a non-transitory computer-readable storage medium), the computer-readable storage medium stores therein computer program instructions that, when run on a computer (e.g., the display apparatus), cause the computer to execute the display method in any embodiment of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage medium described in the present disclosure may represent one or more devices and/or other machine-readable storage media for storing information. The term "machine-readable storage medium" may include, but is not limited to, wireless channels and various other media capable of storing, containing and/or carrying instructions and/or data.

Some embodiments of the present disclosure provide a computer program product. The computer program product includes computer program instructions that, when executed by a computer, cause the computer to perform the display method as described in the above embodiments.

Some embodiments of the present disclosure further provide a computer program. When executed by a computer (e.g., a display apparatus), the computer program causes the computer to perform the display method as described in the above embodiments.

Beneficial effects of the computer-readable storage medium, the computer program product, and the computer program are same as the beneficial effects of the display method as described in some embodiments described above, and details will not be repeated here.

Figure 16:
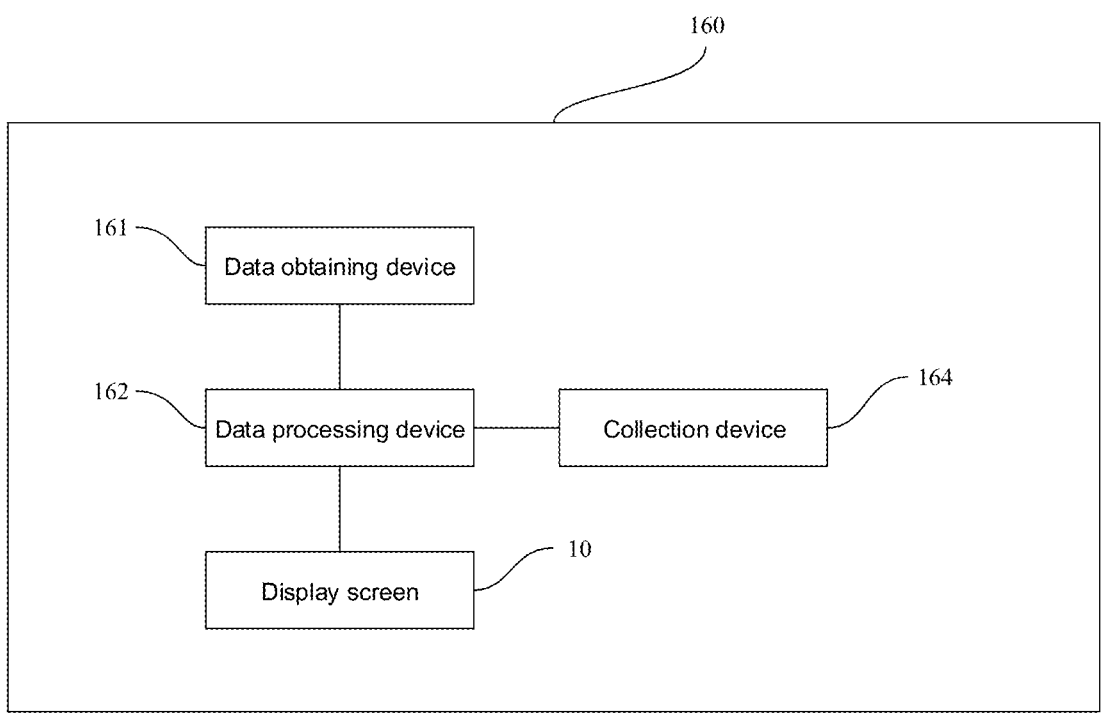
FIG. 16 is a structural diagram of a display apparatus, in accordance with some embodiments.

Some embodiments of the present disclosure provide a display apparatus, as shown in FIG. 16, the display apparatus 160 includes a display screen 10, a data obtaining device 161, and a data processing device 162.

As shown in FIG. 1, the display screen 10 includes a plurality of display sub-regions 11.

As shown in FIG. 16, the data obtaining device 161 is configured to obtain to-be-displayed image data, the to-be-displayed image data includes OSD image data, and the OSD image data includes OSD image sub-data of n viewpoints, where n is an integer greater than or equal to 2.

As shown in FIG. 16, the data processing device 162 is configured to: purse the OSD image data, and perform data rearrangement on the pursed OSD image data; determine a to-be-displayed region 20 corresponding to the OSD image data on the display screen 10 according to location information of the OSD image data; and control the to-be-displayed region 20 of the display screen 10 to display rearranged OSD image data; the to-be-displayed region 20 includes at least one display sub-region 11, and the rearranged OSD image data includes rearranged OSD image sub-data of part or all of viewpoints. For example, as shown in FIG. 8, the data processing device may include a data receiving and conversion module, a data parsing and rearrangement module, a display data processing module, an OSD image data processing module, a data fusion module, and a data conversion and sending module.

Based on the above solution, the to-be-displayed image data includes the OSD image data, and the OSD image data includes the OSD image sub-data of n viewpoints; that is to say, the to-be-displayed image data includes the OSD image sub-data of n viewpoints, and the OSD image sub-data of n viewpoints may be stored in the memory of the system end circuit. Therefore, in order to ensure the correct display of the OSD image, there is a need to broke up and rearrange the image data in the system end (such as a graphics card), and input the rearranged image data into a control system of the display apparatus. The control system of the display apparatus parses and rearranges the data, and outputs the rearranged OSD image data to the display screen 10 of the display apparatus according to display requirements, then the OSD image of multiple viewpoints may be displayed on the display screen 10 at the same time, thereby achieve 3D display of the OSD image.

In some embodiments, as shown in FIG. 9, the to-be-displayed image data further includes source image data, and the data processing device 162 is further configured to parse the source image data, and perform data rearrangement on the parsed source image data. The display range of the source image may be the entire display screen 10 or a partial display region of the display screen 10.

In some embodiments, as shown in FIGS. 7A to 7F, the data processing device 162 is configured to replace the rearranged source image data corresponding to the to-be-displayed region 20 with the rearranged OSD image data according to the to be displayed region 20 corresponding to the OSD image data, or superimpose the rearranged OSD image data on the rearranged source image data corresponding to the to-be-displayed region 20.

In some embodiments, as shown in FIGS. 7E and 7F, the data processing device is configured to set transparency for the rearranged OSD image data, and superimpose the rearranged OSD image data after setting transparency on the rearranged source image data corresponding to the to-be-displayed region 20.

In some embodiments, as shown in FIG. 7A, OSD image sub-data of each viewpoint includes A secondary pixels, where A is an integer greater than or equal to 2; the data processing device is configured to rearrange all secondary pixels in the OSD image sub-data of n viewpoints; different secondary pixels in the rearranged OSD image sub-data corresponding to n viewpoints are located in different rows. The secondary pixels may include red, green, blue, black, white, and yellow secondary pixels.

In some embodiments, as shown in FIG. 7A, the A secondary pixels include a first secondary pixel, and the first secondary pixel is any secondary pixel in the A secondary pixels; the first secondary pixel includes t sub-pixels, and t is an integer greater than or equal to 2. Each secondary pixel of the source image data of each viewpoint includes m sub-pixels, and m is an integer greater than or equal to 1. It will be understood that a value of m and a value of t may be the same or different.

In some embodiments, the data processing device 162 is configured to: purse the OSD image data to obtain display parameters of the OSD image data and display data of the OSD image data, the display parameters of the OSD image data including a viewpoint number and a display sub-region identifier corresponding to the OSD image data, and a capacity of the display data of the OSD image data; and rearrange the display data of the OSD image data according to the display parameters of the OSD image data. The display sub-region identifier corresponding to the OSD image data may be obtained by labeling the display sub-regions 11 of the display screen 10.

In some embodiments, the data obtaining device 161 is configured to photograph, by using n cameras, a first OSD model from different viewpoints to obtain the OSD image sub-data of n viewpoints, or obtain a second OSD model by a three-dimensional modeling or an image processor to obtain the OSD image sub-data of n viewpoints according to the second OSD model. The second OSD model may be generated in real time by the three-dimensional modeling or the image processor, and slice or image generation and output are performed on the second OSD model from different viewpoints, so that the OSD image sub-data of n viewpoints is obtained. The operation of the three-dimensional modeling or the image processor may be completed by the internal system or an external system of the display apparatus.

In some embodiments, the location information of the OSD image data includes a start location of the to-be-displayed region 20, and length information and width information of the to-be-displayed region 20. The range of the to-be-displayed region 20 may be determined according to the start location of the to-be-displayed region 20 and the length information and width information of the to-be-displayed region 20.

In some embodiments, the data obtaining device is further configured to: acquire a first instruction, the first instruction being used to switch a display mode of the OSD image from 3D display to 2D display, or switch the display mode of the OSD image from 2D display to 3D display; and obtain two-dimensional OSD image data or three-dimensional OSD image in response to the first instruction. The data processing device is configured to: control the display screen 10 to display a two-dimensional OSD image according to the to-be-displayed region 20 corresponding to the two-dimensional OSD image data; or control the display screen 10 to display a three-dimensional OSD image according to the to-be-displayed region 20 corresponding to the three-dimensional OSD image data. Therefore, in the present disclosure, the switching between 2D display and 3D display may be achieved.

In some embodiments, the display apparatus further includes a collection device configured to acquire a face image or pupil image of a user to determine a main viewing region of the user; and/or acquire a gesture image of the user to determine a main viewpoint region of the user. The data processing device is further configured to perform high-definition display of the OSD image data of the main viewing region and/or the main viewpoint region; and perform low-definition display of the OSD image data outside of the main viewing region and/or the main viewpoint region. The data processing device 162 is configured reasonably to perform different data processing on different regions, so that a good visual effect is ensured and a waste of computing resources may be avoided.

As for the display apparatus provided by the embodiments of the present disclosure, 3D display of the OSD images may be achieved, and a user may observe different OSD images at different viewing angles; in addition, for different regions, high-definition display or low-resolution display may be performed in different regions.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display method, applied to a display apparatus, a display screen of the display apparatus including a plurality of display sub-regions, the display method comprising:
    obtaining to-be-displayed image data, wherein the to-be-displayed image data includes on screen display (OSD) image data, and the OSD image data includes OSD image sub-data of n viewpoints, n being an integer greater than or equal to 2;
    parsing the OSD image data, and performing data rearrangement on the parsed OSD image data; and
    determining a to-be-displayed region corresponding to the OSD image data on the display screen according to location information of the OSD image data, and displaying rearranged OSD image data in the to-be-displayed region; wherein the to-be-displayed region includes at least one display sub-region, and the rearranged OSD image data includes rearranged OSD image sub-data of part or all of viewpoints; wherein
    OSD image sub-data of each viewpoint includes A secondary pixels, A being an integer greater than or equal to 2; performing the data rearrangement on the parsed OSD image data includes:
        rearranging all secondary pixels in the OSD image sub-data of n viewpoints; wherein different secondary pixels in the rearranged OSD image sub-data of n viewpoints are located in different rows:
    parsing the OSD image data, and performing the data rearrangement on the parsed OSD image data includes:
        pursing the OSD image data, and obtaining display parameters of the OSD image data and display data of the OSD image data; wherein the display parameters of the OSD image data include a viewpoint number and a display sub-region identifier corresponding to the OSD image data, and a capacity of the display data of the OSD image data; and
        performing the data rearrangement on the display data of the OSD image data according to the display parameters of the OSD image data.

2. The display method according to claim 1, wherein the to-be-displayed image data further includes source image data, the method further comprises:
    parsing the source image data; and performing data rearrangement on the parsed source image data.

3. The display method according to claim 2, wherein displaying the rearranged OSD image data in the to-be-displayed region, includes:
    according to the to-be-displayed region corresponding to the OSD image data on the display screen, replacing rearranged source image data corresponding to the to-be-displayed region with the rearranged OSD image data, or superposing the rearranged OSD image data on the rearranged source image data corresponding to the to-be-displayed region.

4. The display method according to claim 3, wherein superimposing the rearranged OSD image data on the rearranged source image data corresponding to the to-be-displayed region includes:
    setting transparency for the rearranged OSD image data; and superimposing the rearranged OSD image data after setting transparency on the rearranged source image data corresponding to the to-be-displayed region.

5. The display method according to claim 1, wherein the A secondary pixels include a first secondary pixel, the first secondary pixel is any of the A secondary pixels, and the first secondary pixel includes t sub-pixels, t being an integer greater than or equal to 2.

6. The display method according to claim 1, wherein obtaining the OSD image sub-data of n viewpoints includes:
    photographing, by using n cameras, a first OSD model from different viewpoints to obtain the OSD image sub-data of n viewpoints; or
    obtaining a second OSD model by a three-dimensional modeling or an image processor to obtain the OSD image sub-data of n viewpoints according to the second OSD model.

7. The display method according to claim 1, wherein the location information of the OSD image data includes a start location of the to-be-displayed region, and length information and width information of the to-be-displayed region.

8. The display method according to claim 1, further comprising:
    acquiring a first instruction; wherein the first instruction is used to switch a display mode of the OSD image from 3D display to 2D display, or switch the display mode of the OSD image from 2D display to 3D display;
    obtaining two-dimensional OSD image data or three-dimensional OSD image in response to the first instruction; and
    displaying a two-dimensional OSD image on the display screen according to the to-be-displayed region corresponding to the two-dimensional OSD image data; or displaying a three-dimensional OSD image on the display screen according to a to-be-displayed region corresponding to the three-dimensional OSD image data.

9. The display method according to claim 1, further comprising:
    acquiring a face image or pupil image of a user, and determining a main viewing region of the user; and/or acquiring a gesture image of the user, and determining a main viewpoint region of the user;
    performing high-definition display of OSD image data and/or source image data of the main viewing region and/or the main viewpoint region; and
    performing low-definition display of OSD image data and/or source image data outside of the main viewing region and/or the main viewpoint region.

10. A non-transitory computer-readable storage medium having stored computer program instructions that, when run on a computer, cause the computer to perform the display method according to claim 1.

11. A display apparatus, comprising:
    a display screen including a plurality of display sub-regions;

a data obtaining device configured to obtain to-be-displayed image data, wherein the to-be-displayed image data includes on screen display (OSD) image data, and the OSD image data includes OSD image sub-data of n viewpoints, n being an integer greater than or equal to 2; and a data processing device configured to: purse the OSD image data, and perform data rearrangement on the pursed OSD image data; and determine a to-be-displayed region corresponding to the OSD image data on the display screen according to location information of the OSD image data, and control the to-be-displayed region of the display screen to display rearranged OSD image data; wherein the to-be-displayed region includes at least one display sub-region, and the rearranged OSD image data includes rearranged OSD image sub-data of part or all of viewpoints; wherein OSD image sub-data of each viewpoint includes A secondary pixels, A being an integer greater than or equal to 2; the data processing device is further configured to rearrange all secondary pixels in the OSD image sub-data of n viewpoints, wherein different secondary pixels in the rearranged OSD image sub-data of n viewpoints are located in different rows; and the data processing device is further configured to: purse the OSD image data to obtain display parameters of the OSD image data and display data of the OSD image data; wherein the display parameters of the OSD image data include a viewpoint number and a display sub-region identifier corresponding to the OSD image data, and a capacity of the display data of the OSD image data; and perform the data rearrangement on the display data of the OSD image data according to the display parameters of the OSD image data.

12. The display apparatus according to claim 11, wherein the to-be-displayed image data further includes source image data, the data processing device is further configured to parse the source image data, and perform data rearrangement on the parsed source image data; or wherein the to-be-displayed image data further includes source image data, the data processing device is further configured to parse the source image data, and perform data rearrangement on the parsed source image data; the data processing device is further configured to, according to the to-be-displayed region corresponding to the OSD image data, replace rearranged source image data corresponding to the to-be-displayed region with the rearranged OSD image data, or superposing the rearranged OSD image data on the rearranged source image data corresponding to the to-be-displayed region.

13. The display apparatus according to claim 12, wherein the data processing device is further configured to: set transparency for the rearranged OSD image data; and superimposing the rearranged OSD image data after setting transparency on the rearranged source image data corresponding to the to-be-displayed region.

14. The display apparatus according to claim 11, wherein the A secondary pixels include a first secondary pixel, the first secondary pixel is any of the A secondary pixels, and the first secondary pixel includes t sub-pixels, t being an integer greater than or equal to 2.

15. The display apparatus according to claim 11, wherein the data obtaining device is configured to:

photograph, by using n cameras, a first OSD model from different viewpoints to obtain the OSD image sub-data of n viewpoints; or obtain a second OSD model by a three-dimensional modeling or an image processor to obtain the OSD image sub-data of n viewpoints according to the second OSD model.

16. The display apparatus according to claim 11, the data obtaining device is further configured to: acquire a first instruction, wherein the first instruction is used to switch a display mode of the OSD image from 3D display to 2D display, or switch the display mode of the OSD image from 2D display to 3D display; and obtain two-dimensional OSD image data or three-dimensional OSD image in response to the first instruction; and the data processing device is further configured to: control the display screen to display a two-dimensional OSD image according to the to-be-displayed region corresponding to the two-dimensional OSD image data; or control the display screen to display a three-dimensional OSD image according to the to-be-displayed region corresponding to the three-dimensional OSD image data.

17. The display apparatus according to claim 11, further comprising a collection device configured to: acquire a face image or pupil image of a user and determine a main viewing region of the user; and/or acquire a gesture image of the user and determine a main viewpoint region of the user; wherein the data processing device is further configured to: perform high-definition display of OSD image data and/or source image data of the main viewing region and/or the main viewpoint region; and perform low-definition display of the OSD image data and/or source image data outside of the main viewing region and/or the main viewpoint region.

* * * * *